(12) United States Patent
Asveren

(10) Patent No.: US 10,341,932 B1
(45) Date of Patent: Jul. 2, 2019

(54) METHODS, APPARATUS AND SYSTEMS FOR DETERMINING WHETHER TO INCLUDE AN ACCESS TRANSFER GATEWAY IN A CALL FLOW

(71) Applicant: Ribbon Communications Operating Company, Inc., Westford, MA (US)

(72) Inventor: Tolga Asveren, Bordentown, NJ (US)

(73) Assignee: Ribbon Communications Operating Company, Inc., Westford, MA (US)

(\*) Notice: Subject to any disclaimer, the term of this patent is extended or adjusted under 35 U.S.C. 154(b) by 438 days.

(21) Appl. No.: 14/671,518

(22) Filed: Mar. 27, 2015

Related U.S. Application Data

(60) Provisional application No. 62/139,108, filed on Mar. 27, 2015.

(51) Int. Cl.

| | | |
|---|---|---|
| *H04W 40/22* | (2009.01) | |
| *H04W 40/34* | (2009.01) | |
| *H04W 40/20* | (2009.01) | |
| *H04L 29/12* | (2006.01) | |
| *H04L 29/06* | (2006.01) | |

(52) U.S. Cl.
CPC ......... *H04W 40/22* (2013.01); *H04L 61/2046* (2013.01); *H04L 65/1006* (2013.01); *H04L 65/1069* (2013.01); *H04W 40/20* (2013.01); *H04W 40/34* (2013.01)

(58) Field of Classification Search
CPC .............. H04L 61/204; H04L 65/1006; H04L 65/1069; H04W 40/22; H04W 40/20; H04W 40/34

USPC ........................................................ 370/329
See application file for complete search history.

(56) References Cited

U.S. PATENT DOCUMENTS

| | | | |
|---|---|---|---|
| 7,991,382 B1\* | 8/2011 | Gunasekara | H04L 12/6418 455/404.1 |
| 9,148,453 B1\* | 9/2015 | Pankajakshan | H04L 65/105 |
| 2006/0126565 A1 | 6/2006 | Shaheen | |
| 2006/0194580 A1 | 8/2006 | Gruber | |
| 2007/0118604 A1\* | 5/2007 | Costa Requena | H04L 51/04 709/206 |
| 2008/0186953 A1 | 8/2008 | Buckley et al. | |
| 2008/0267128 A1 | 10/2008 | Bennett et al. | |
| 2009/0086674 A1 | 4/2009 | Ejzak | |
| 2010/0135206 A1 | 6/2010 | Cherian et al. | |
| 2010/0157866 A1 | 6/2010 | Sarikaya et al. | |
| 2010/0157904 A1 | 6/2010 | Ho et al. | |
| 2010/0195621 A1 | 8/2010 | Kekki et al. | |
| 2010/0285797 A1 | 11/2010 | Ghai et al. | |
| 2011/0280217 A1\* | 11/2011 | Drevon | H04W 48/18 370/331 |
| 2012/0142341 A1\* | 6/2012 | Nagpal | H04W 48/18 455/426.1 |

(Continued)

OTHER PUBLICATIONS

"3GPP: Technical Specification Group Core Network and Terminals", CAMEL Phase 4; Stage2; TS 23.078 v12.0.0, Sep. 2013.\*

*Primary Examiner* — Asad M Nawaz
*Assistant Examiner* — Saad A. Waqas
(74) *Attorney, Agent, or Firm* — Straub & Straub; Stephen T. Straub; Michael P. Straub

(57) ABSTRACT

Methods, apparatus, and systems for determining during call setup whether or not to introduce an Access Transfer Gateway into a call path between devices based on a geographical indication of the position of one of the devices.

20 Claims, 16 Drawing Sheets

(56) References Cited

U.S. PATENT DOCUMENTS

| | | | |
|---|---|---|---|
| 2013/0208658 A1* | 8/2013 | Santos | H04W 76/02 370/328 |
| 2014/0094210 A1* | 4/2014 | Gellens | H04W 4/12 455/517 |
| 2015/0029949 A1* | 1/2015 | Tsai | H04W 48/18 370/329 |
| 2015/0098316 A1* | 4/2015 | Ku | H04W 8/26 370/218 |
| 2015/0304895 A1* | 10/2015 | Miyagawa | H04W 68/12 455/436 |
| 2016/0142447 A1* | 5/2016 | Mufti | H04L 65/1046 370/260 |

\* cited by examiner

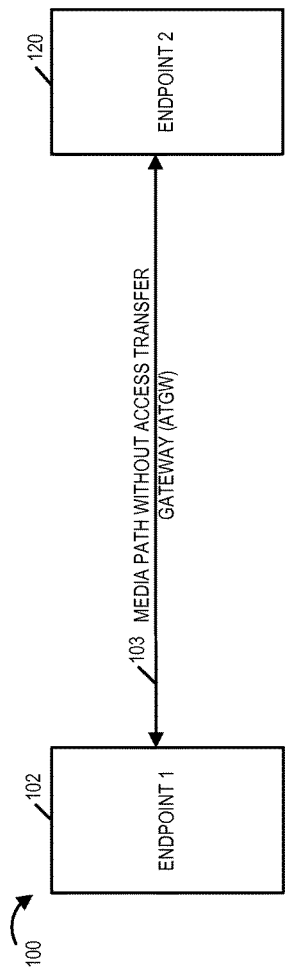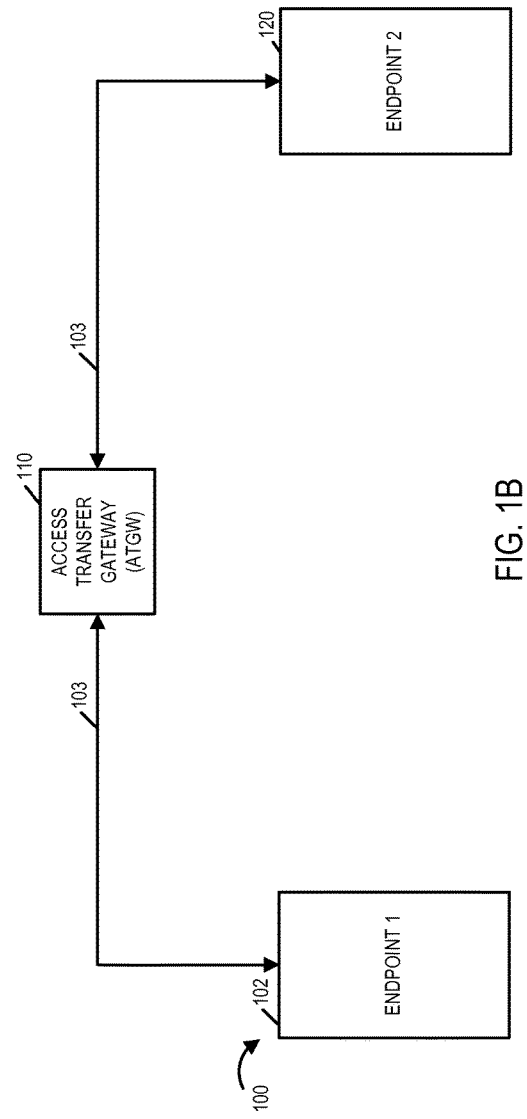
FIG. 1A
FIG. 1B

METHODS, APPARATUS AND SYSTEMS FOR DETERMINING WHETHER TO INCLUDE AN ACCESS TRANSFER GATEWAY IN A CALL FLOW

RELATED APPLICATION

The present application claims the benefit of the filing date of U.S. Provisional Application Ser. No. 62/139,108 filed on Mar. 27, 2015 which is hereby expressly incorporated by reference in its entirety.

FIELD

The present invention relates to methods, apparatus and systems for mobile telecommunications using Internet Protocol and more particularly to determining whether or not to include an Access Transfer Gateway in a call flow.

BACKGROUND

In fourth generation mobile telecommunications technology networks, i.e., 4G networks, real time services such as audio and/or video are provided over Internet Protocol (IP) using sessions. For example, multimedia services can and sometimes are provided over Internet Protocol Multimedia Core Network Subsystems. However, 4G network coverage is not universal and there are currently many geographical areas with third generation mobile telecommunications technology network coverage, i.e., 3G coverage, but no 4G coverage. When a device moves from a geographic location having 4G coverage to a geographic location having 3G coverage, the device is assigned a new IP address during what is sometimes referred to as a 4G to 3G fallback operation. This causes a change in the media IP Address used by the device for on-going sessions. One known approach of handling this change in the IP Address for on-going sessions requires that the new IP Address be communicated to the other end of the session. However, this approach introduces a non-negligible amount of delay during the transition from 4G to 3G. As a result, a new network element referred to as an Access Transfer Gateway (ATGW) which is controlled by an Access Transfer Control Function (ATCF) has been proposed. See the technical specification 3GPP TS 29.334 V10.2.0 produced by the 3rd Generation Partnership Project (3GPP) and the technical specification ETSI TS 123 237 V12.7.0 produced by the ETSI 3rd Generation Partnership Project. This network element is introduced to and remains on the media call path from the beginning of call. When a change in a device's IP address occurs during a session, the new IP address of the device is communicated only to the ATGW and the far end device is shielded from the change eliminating the latency introduced by sending a signaling message from the device with the changed IP address to the far end device.

Introducing an Access Transfer Gateway into the media path for all calls introduces a number of problems. First a new device is needed with a very high aggregate media handling capability and second latency is introduced to media streams for all calls as the media streams for all calls are routed through the Access Transfer Gateway.

In view of the above discussion, there is a need for new methods and apparatus for determining whether or not to include an Access Transfer Gateway in a call flow.

SUMMARY

Various embodiments are directed to methods, apparatus, and systems for determining when to include an Access Transfer Gateway in a call flow for an Internet Protocol mobile communications call.

Various embodiments of the invention use one or more heuristic methods to determine whether it is likely or probable for a device to go from operating on a 4G network to a 3G network during a session. These heuristic methods are performed during call setup for example during processing of INVITE and 18X Session Initiation Protocol (SIP) messages respectively for calling and called devices.

One embodiment of the invention includes a method comprising the steps of receiving, at a first processing node, a call setup message from a first user device to a second user device; making a first determination based at least in part on a geographical location indicator corresponding to the first user device whether to introduce into a call path between the first user device and the second user device an Access Transfer Gateway (ATGW); and controlling, by the first processing node, the introduction of the ATGW into the call path based upon the first determination. In some embodiments, the method further includes determining the global positioning system coordinates of the first user device, said global position system coordinates being said geographical location indicator and wherein making said first determination is further based on one or more of the following: a velocity of the first user device or a signal strength of the first user device. In some embodiments the first user device is a mobile device operating within a 4G network and the first determination is further based on a probability of said first user device switching from operating on said 4G network to a 3G network during the duration of a call to be setup in response to said call setup message.

The invention also covers apparatus and systems. Another embodiment of the invention is a system which includes a first processing node such as for example a Session Border Controller, including a receiver configured to receive a call setup message such as for example a SIP Invite message from a first user device such as a mobile phone to a second user device such as another mobile phone, a determination module configured to make a first determination, based at least in part on a geographical location indicator corresponding to the first user device, whether to introduce an Access Transfer Gateway (ATGW), into a call path between the first user device and the second user device; and a control module in said first processing node configured to control the introduction of the ATGW into the call path based upon the first determination. In some embodiments, the system further includes a global positioning system (GPS) receiver configured to determine the global positioning system coordinates of the first user device, said global position system coordinates being said geographical location indicator; and the determination module is configured to make said first determination further based on one or more of the following: a velocity of the first user device or a signal strength of the first user device. In some embodiments, the first user device of the system is a mobile device operating within a 4G network and the determination module is configured to make said first determination further based on a probability of said first user device switching from operating on said 4G network to a 3G network during the duration of a call to be setup in response to said call setup message.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 1A is a drawing illustrating an exemplary communications system with a call media path without an Access Transfer Gateway.

FIG. 1B is a drawing illustrating an exemplary communications system with a call media path including an Access Transfer Gateway.

DETAILED DESCRIPTION

The present invention relates to methods, apparatus, and systems for determining whether or not to introduce an Access Transfer Gateway into a call flow for mobile communications using Internet Protocol. In some embodiments of the invention, a mobile equipment device operating in a 4G network determines the probability/likelihood of a 4G to 3G fallback occurring during a call to be setup based on information related to the mobile equipment device's location and sends information of the probability/likelihood of a 4G/3G fallback to a Session Border Controller that then inserts or does not insert an Access Transfer Gateway into the call path being setup for the call based on the received information. In some other embodiments, the user equipment device sends location related information to a Session Border Controller which upon its receipt determines the probability/likelihood of a 4G/3G fallback occurring during a call to be setup and based on the determined probability inserts or does not insert an Access Transfer Gateway into the call path of the call being setup. The details of various exemplary embodiments of the invention are now explained in further detail below. Elements identified in the Figures with the same numerals are the same or similar.

FIG. 1A is a drawing illustrating a communications system call path that has a media path that does not include an Access Transfer Gateway (ATGW). System 100 of FIG. 1A includes an endpoint 1 102, an endpoint 2 120, and a communications link 103. The communication system 100 of FIG. 1A illustrates a system wherein a direct media path has been established over communication link 103 between endpoint 1 and endpoint 2 without an ATGW. The endpoint 1 is an internet protocol mobile communications user device such as for example a smartphone, cellphone, laptop, or tablet. The endpoint 2 is also an internet protocol communications user device such as for example a smartphone, cellphone, laptop, tablet or computer. The communications link 103 while shown as a single link is actually an IP network link.

FIG. 1B illustrates the same system 100 but including an Access Transfer Gateway (ATGW) 110 in the media call path along communication link 103.

Figure 1C:
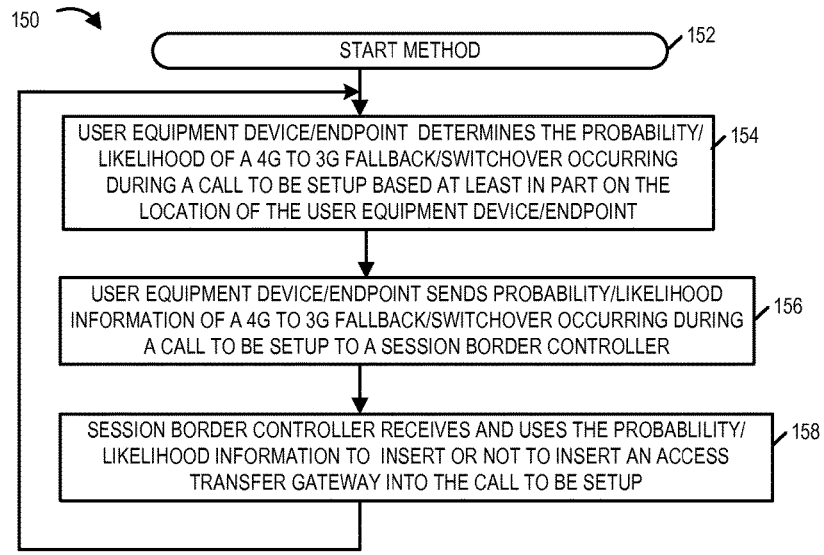
FIG. 1C is a drawing illustrating an exemplary method in accordance with an embodiment of the present invention.

FIG. 1C illustrates an exemplary method 150 in accordance with an embodiment of the present invention. The method starts at step 152 and proceeds to step 154. In step 154, a user equipment device/endpoint determines the probability/likelihood of a 4G to 3G fallback/switchover occurring during a call to be setup based at least in part on the location of the user equipment device/endpoint. Operation proceeds from step 154 to step 156. In step 156, the user equipment device/endpoint sends probability/likelihood of a 4G to 3G fallback/switchover occurring during a call to be setup to a Session Border Controller. Operation proceeds from step 156 to step 158. In step 158, the Session Border Controller receives the probability/likelihood information. Based on the received probability/likelihood information the Session Border Controller inserts or does not insert an Access Transfer Gateway into the call to be setup. Operation proceeds from step 158 back to step 154 where the method proceeds with respect to the next user equipment device.

Figure 1D:
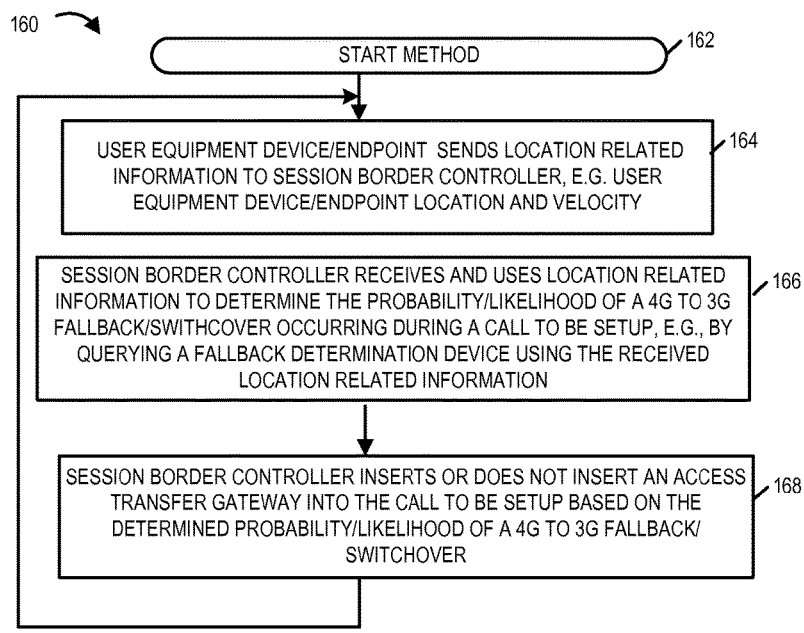
FIG. 1D is a drawing illustrating an exemplary method in accordance with an embodiment of the present invention.

FIG. 1D illustrates another exemplary method 160 in accordance with an embodiment of the present invention. The method starts at step 162 and proceeds to step 164. In step 164, a user equipment device/endpoint sends location related information, e.g., the user equipment device's location and velocity, to a Session Border Controller. Operation proceeds from step 164 to step 166. In step 166, the Session Border Controller receives and uses the location related information to determine the probability/likelihood of a 4G to 3G fallback/switchover occurring during a call to be setup, e.g., by querying a fallback determination device/server using the received location related information. Operation proceeds from step 166 to step 168. In step 168, the Session Border Controller inserts or does not insert an Access Transfer Gateway into the call to be setup based on the determined probability/likelihood of a 4G to 3G fallback/switchover occurring. Operation proceeds from step 168 back to step 164 where the method proceeds with respect to the next user equipment device.

Figure 6:
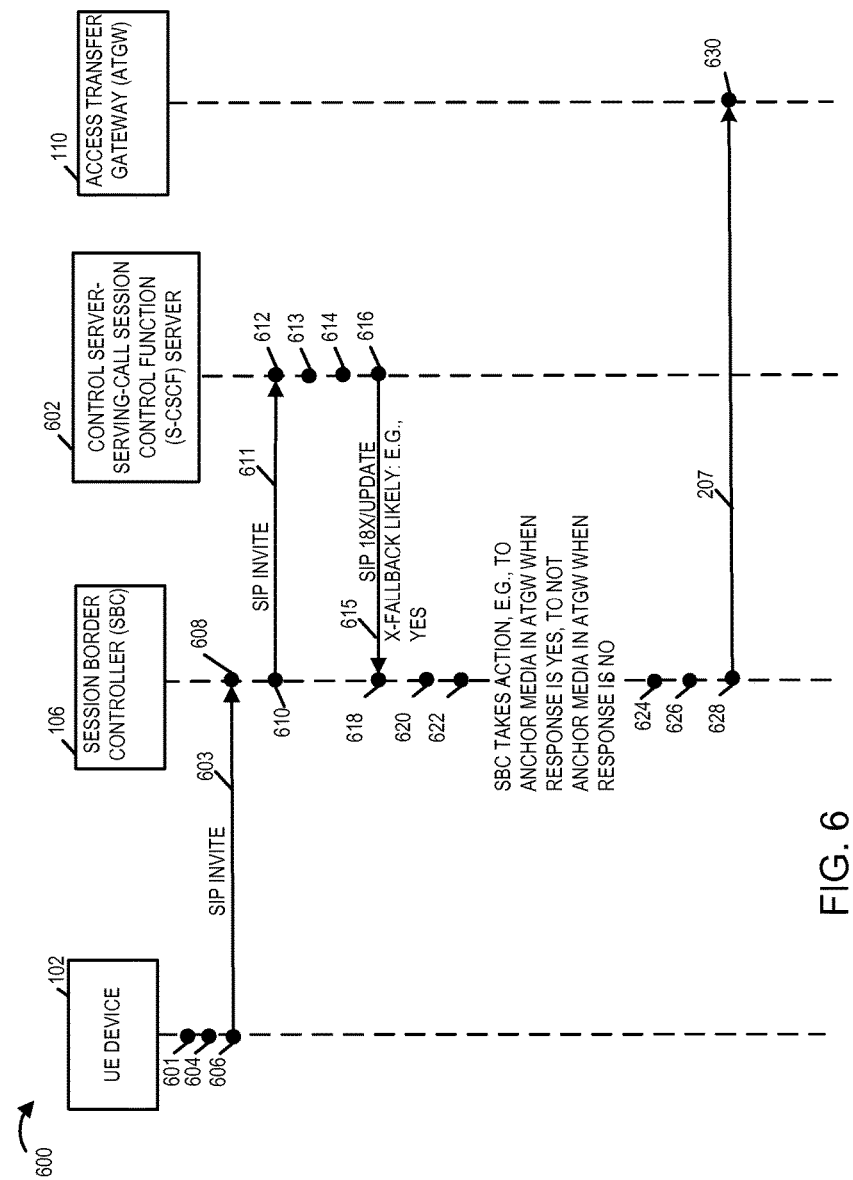
FIG. 6 is a signaling diagram in accordance with an exemplary embodiment of the present invention.
Figure 7:
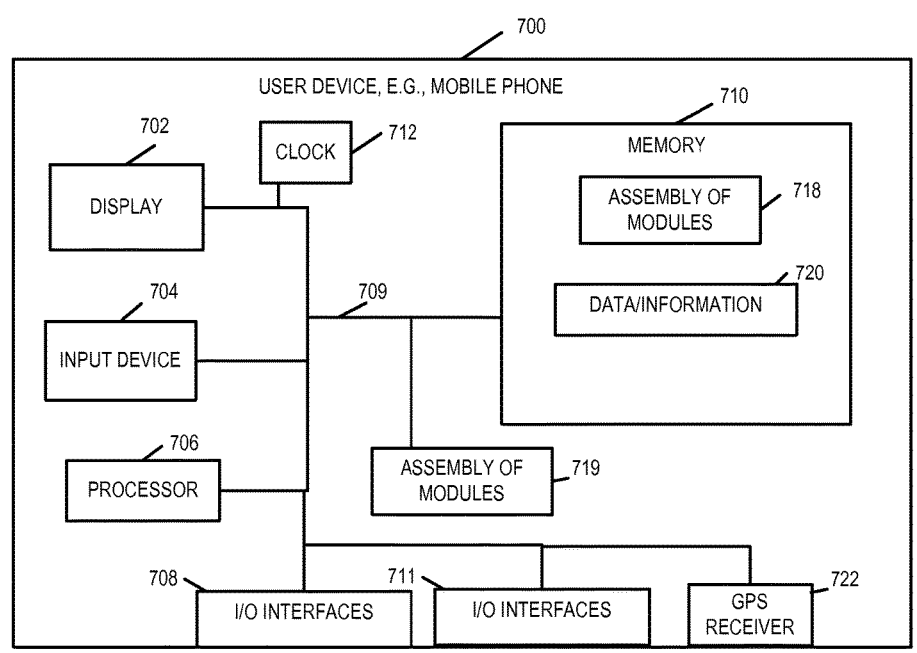
FIG. 7 illustrates an exemplary user device implemented in accordance with an embodiment of the present invention.

FIG. 7 is a drawing of an exemplary user equipment device such as a mobile phone in accordance with an exemplary embodiment. Exemplary user device 700 includes a display 702, an input device 704 such as a keypad and/or touch screen, a processor 706, e.g., a CPU, I/O interfaces 708 and 711 which include receivers and transmitters, which couple the user device to various devices and networks, memory 710, a clock 712, and an assembly of modules 719, e.g., circuits corresponding to different modules, coupled together via a bus 709 over which the various elements may interchange data and information. Memory 710 includes an assembly of modules 718, e.g., an assembly of software modules, and data/information 720. The assembly of modules 719 and/or 718 include modules for establishing and receiving VOIP calls and media streams using internet protocol. In some embodiments, the user device 700 includes a GPS receiver 722 coupled to the other components of the device via the bus 709. The GPS receiver 722 may be, and in some embodiments is, used to determine the location, speed and/or velocity of the user device 700. The exemplary end points and user equipment shown or discussed in FIGS. 1A, 1B, 1C, 1D, 2A, 2B, 3, 4, 5 and 6 respectively are in some embodiments implemented as the user device 700 of FIG. 7. The exemplary user device 700 may, and in some embodiments is, implemented as a mobile device such a mobile phone, laptop, smartphone, tablet, or other wireless communications device.

Figure 8:
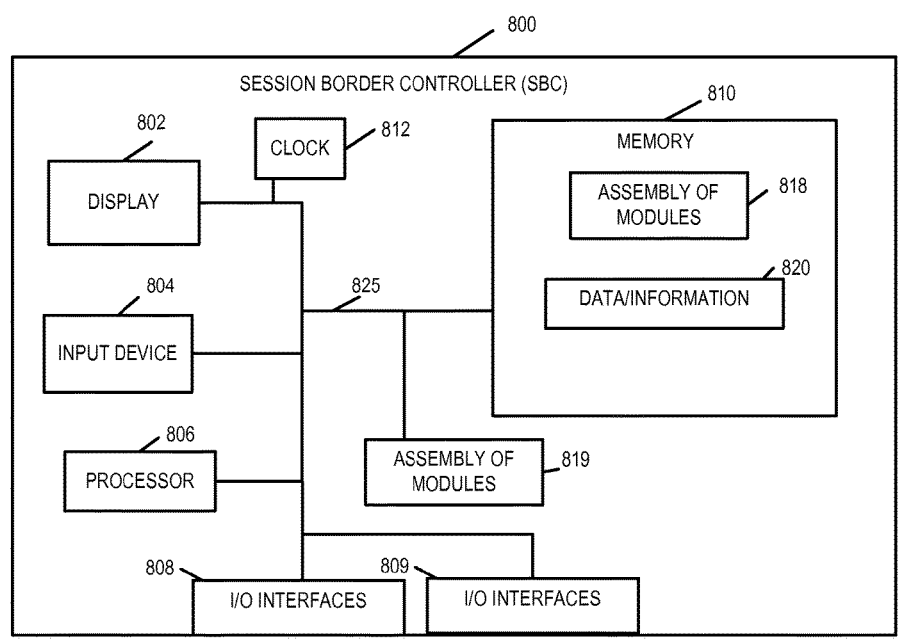
FIG. 8 illustrates an exemplary Session Border Controller implemented in accordance with an embodiment of the present invention.

FIG. 8 is a drawing of an exemplary session border controller (SBC) implemented in accordance with an exemplary embodiment. Exemplary session border controller 800 includes a display 802, an input device 804, a processor 806, e.g., a CPU, I/O interfaces 808 and 809 which include receivers and transmitters, which couple the SBC to various devices including user equipment such as UE 1, a core network or another device, memory 810, a clock 812, and an assembly of modules 819, e.g., circuits corresponding to different modules, coupled together via a bus 825 over which the various elements may interchange data and information. Memory 810 includes an assembly of modules 818, e.g., an assembly of software modules, and data/information 820.

Figure 11:
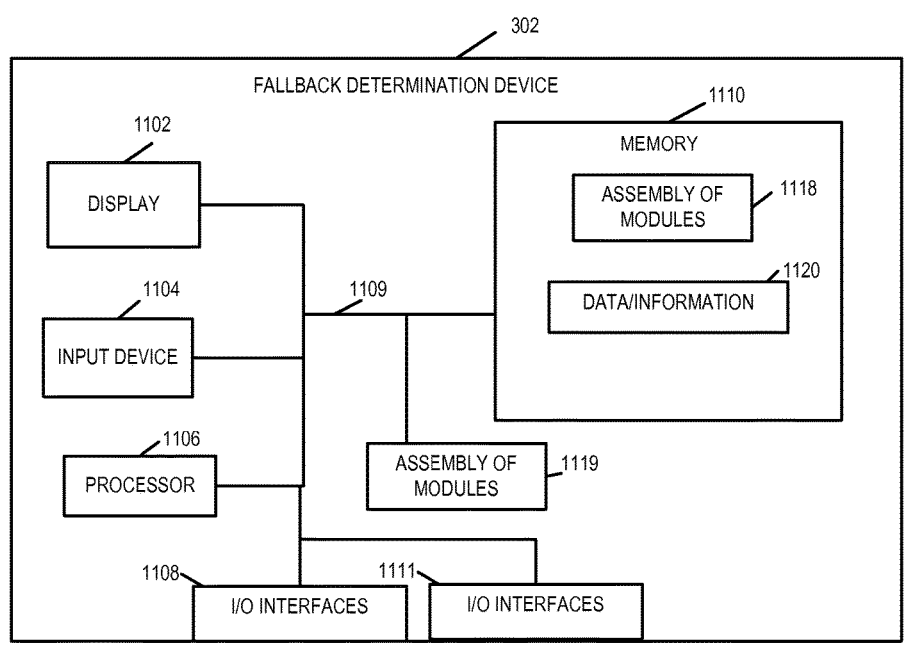
FIG. 11 illustrates an exemplary Fallback Determination Device implemented in accordance with an embodiment of the present invention.

FIG. 11 illustrates an exemplary Fallback Determination Device implemented in accordance with an embodiment of the present invention. Exemplary Fallback determination device 302 includes a display 1102, an input device 1104 such as a keypad, a processor 1106, e.g., a CPU, I/O interfaces 1108 and 1111 which include receivers and transmitters, which couple the fallback determination device to various devices and networks, memory 1110 and an assembly of modules 1119, e.g., circuits corresponding to different modules, coupled together via a bus 1109 over which the various elements may interchange data and information. Memory 1110 includes an assembly of modules 1118, e.g., an assembly of software modules, and data/information 1120. The assembly of modules 1119 and/or 1118 may, and in some embodiments do, include modules for receiving messages, transmitting messages, generating messages, and determining a 4G to 3G switchover/fallback likelihood or probability.

Figure 12:
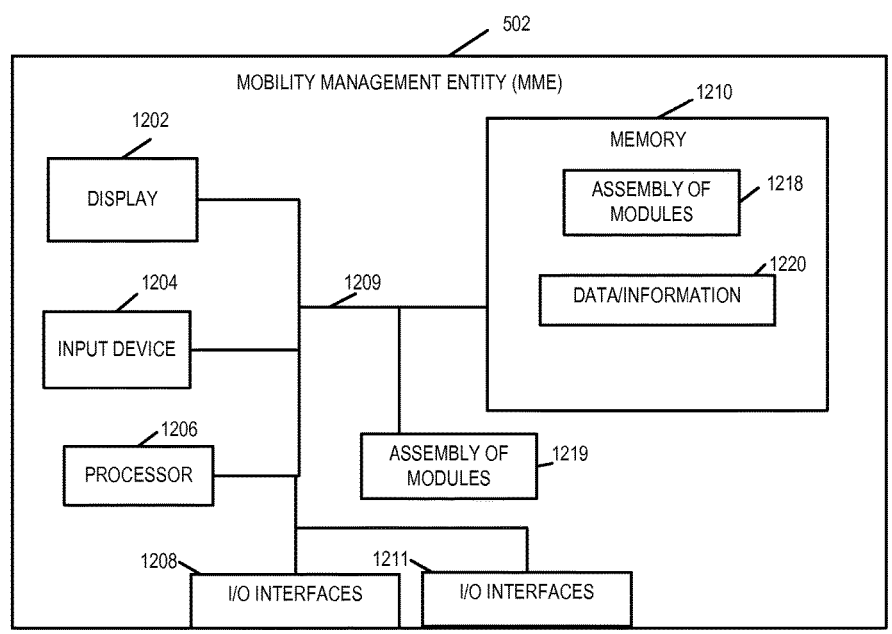
FIG. 12 illustrates an exemplary Mobility Management Entity implemented in accordance with an embodiment of the present invention.

FIG. 12 illustrates an exemplary Mobility Management Entity implemented in accordance with an embodiment of the present invention. Exemplary Mobility Management Entity 502 includes a display 1202, an input device 1204 such as a keypad, a processor 1206, e.g., a CPU, I/O interfaces 1208 and 1211 which include receivers and transmitters, which couple the Mobility Management Entity 502 to various devices and networks, memory 1210 and an assembly of modules 1219, e.g., circuits corresponding to different modules, coupled together via a bus 1209 over which the various elements may interchange data and information. Memory 1210 includes an assembly of modules 1218, e.g., an assembly of software modules, and data/information 1220. The assembly of modules 1219 and/or 1218 may, and in some embodiments do, include modules for receiving messages, transmitting messages, generating messages, and determining the location and velocity of a user device.

Figure 13:
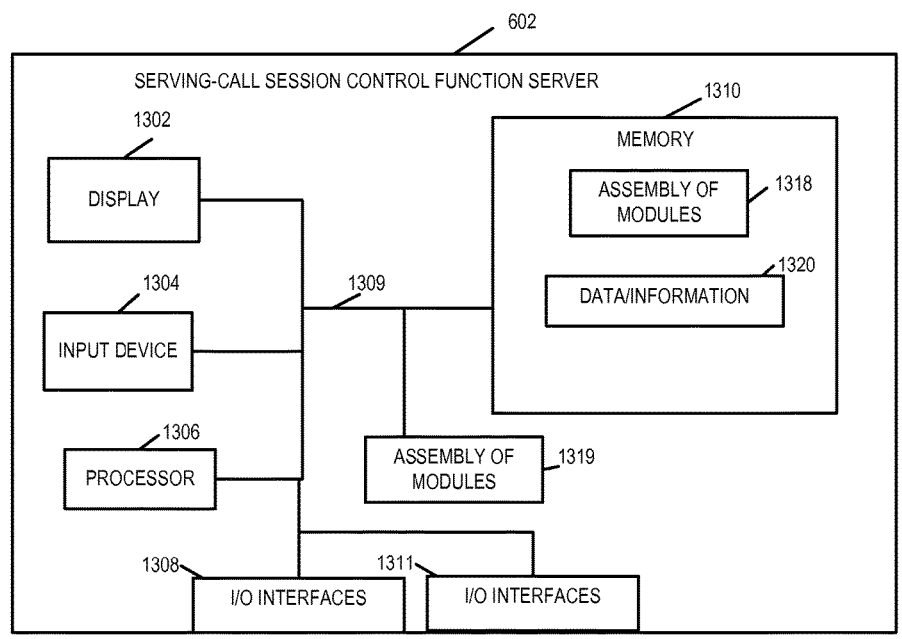
FIG. 13 illustrates an exemplary Serving-Call Session Control Function Server implemented in accordance with an embodiment of the present invention.

FIG. 13 illustrates an exemplary Serving-Call Session Control Function (S-CSCF) Server 602 implemented in accordance with an embodiment of the present invention. Exemplary S-CSCF Server 602 includes a display 1302, an input device 1304 such as a keypad, a processor 1306, e.g., a CPU, I/O interfaces 1308 and 1311 which include receivers and transmitters, which couple the S-CSCF Server 602 to various devices and networks, memory 1310 and an assembly of modules 1319, e.g., circuits corresponding to different modules, coupled together via a bus 1309 over which the various elements may interchange data and information. Memory 1310 includes an assembly of modules 1318, e.g., an assembly of software modules, and data/information 1320. The assembly of modules 1319 and/or 1318 may, and in some embodiments do, include modules for receiving messages, transmitting messages, generating messages, determining the location and velocity of a user device, and determining a 4G to 3G switchover/fallback likelihood or probability.

Figure 14:
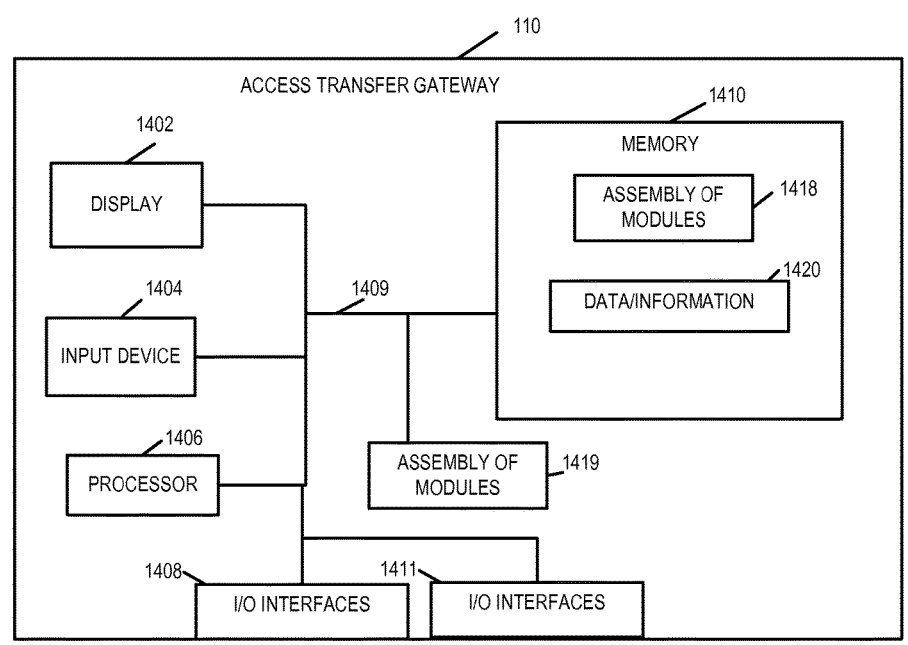
FIG. 14 illustrates an exemplary Access Transfer Gateway implemented in accordance with an embodiment of the present invention.

FIG. 14 illustrates an exemplary Access Transfer Gateway (ATGW) 110 implemented in accordance with an embodiment of the present invention. Exemplary ATGW 110 includes a display 1402, an input device 1404 such as a keypad, a processor 1406, e.g., a CPU, I/O interfaces 1408 and 1411 which include receivers and transmitters, which couple the ATGW 110 to various devices and networks, memory 1410 and an assembly of modules 1419, e.g., circuits corresponding to different modules, coupled together via a bus 1409 over which the various elements may interchange data and information. Memory 1410 includes an assembly of modules 1418, e.g., an assembly of software modules, and data/information 1420. The assembly of modules 1419 and/or 1418, may, and in some embodiments do, include modules for receiving messages, transmitting messages, generating messages, and anchoring the call media for a VOIP call between a first user device and a second user device.

Figure 2A:
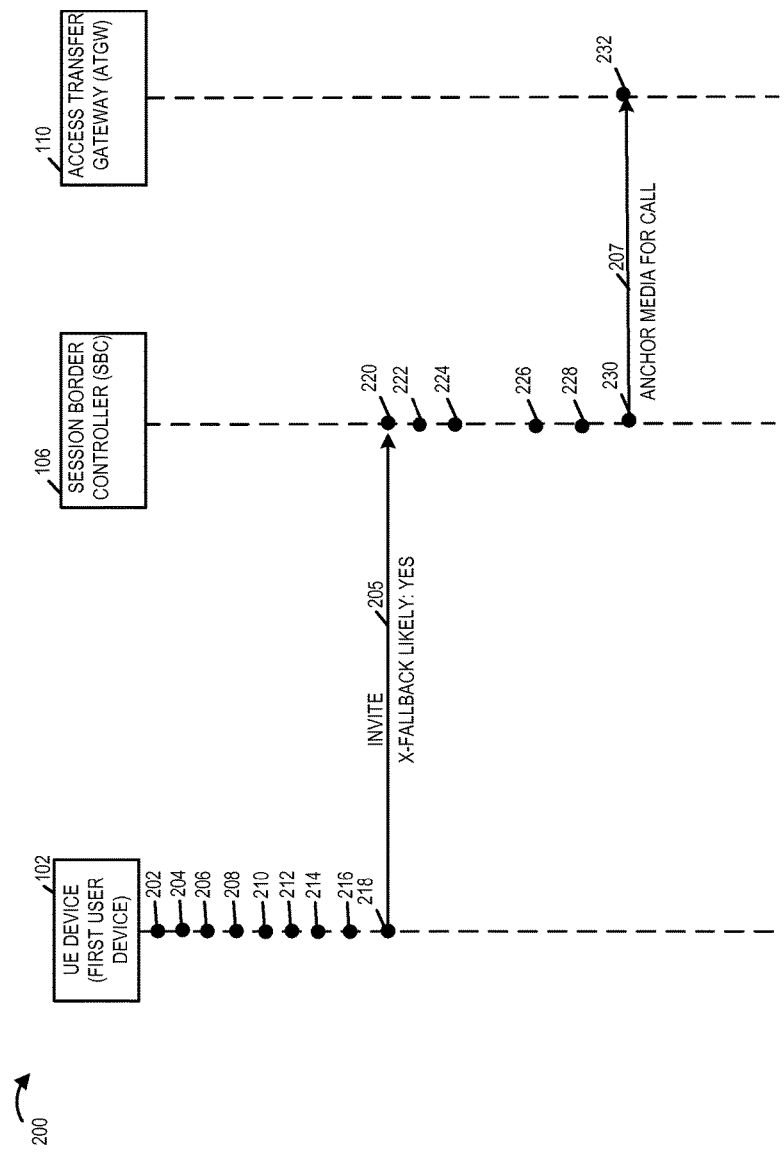
FIG. 2A is an exemplary signaling diagram in accordance with an exemplary embodiment of the present invention.
Figure 2B:
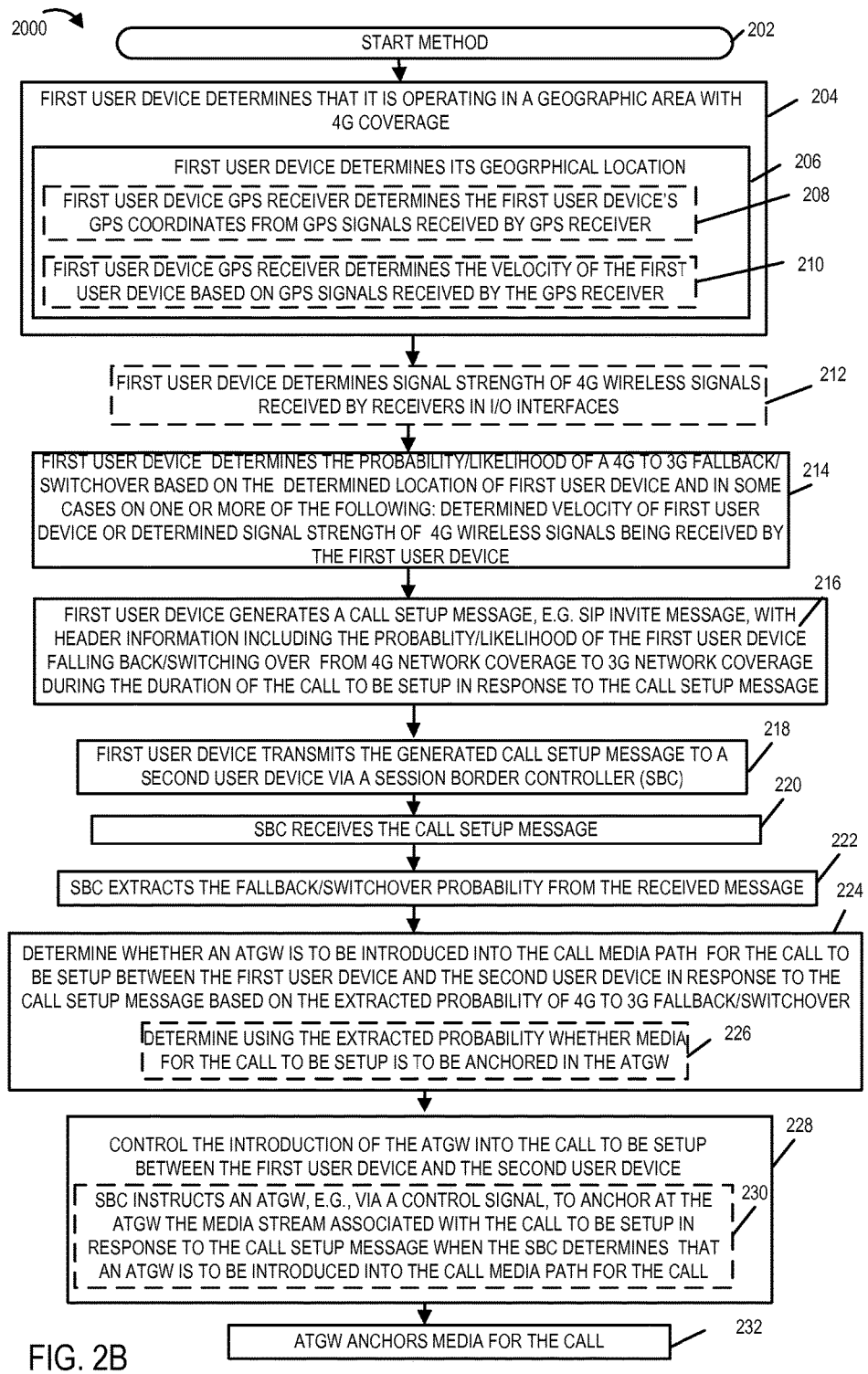
FIG. 2B is an exemplary method implemented in accordance with an exemplary embodiment of the present invention.

FIG. 2A illustrates a signaling diagram 200 showing an exemplary communications system's signaling and the steps implemented as part of an exemplary method. FIG. 2B provides a flowchart 2000 providing further details regarding the steps of the method described in FIG. 2A. For explanatory purposes the communication system has been simplified and only the user equipment device UE 102, session border controller (SBC) 106, and Access Transfer Gateway (ATGW) 110 are shown and described in FIG. 2A although the communication system includes other equipment such as a second user equipment device 2. In this example, the exemplary user device UE 102 also referred to as the first user device is a mobile device implemented in accordance with exemplary user device 700 illustrated in FIG. 7. The exemplary SBC 106 is implemented in accordance with the exemplary SBC 800 illustrated in FIG. 8. FIG. 14 shows the details of exemplary ATGW 110.

The method 2000 starts in step 202 where the processor 706 of the UE device 102 begins executing various instructions from the assembly of modules 718 and various modules from the assembly of modules 719 also operate to perform various steps of the method. Operation proceeds from start step 202 to step 204.

In step 204, the first user equipment device, UE device 102, determines that it is operating in a geographic area with 4G network coverage. Step 204 includes sub-step 206 wherein the UE device 102 determines its geographical location. In some embodiments including the exemplary embodiment sub-step 206 includes sub-step 208 and/or sub-step 210. In sub-step 208, the first user device's Global Position System (GPS) receiver 722 determines its geographical location by determining the device's global positioning system coordinates from global position system signals received by GPS receiver 722. In sub-step 210, the first user device's GPS receiver 722 also determines the velocity of the first user device, UE device 102, based on global positioning system signals received by the GPS receiver 722. Operation proceeds from step 204 to step 212.

In step 212, the first user device, UE device 102, determines the signal strength of 4G wireless signals being received by receivers in I/O interfaces 708 and/or 711. In some embodiments, a signal strength determination module 1010 of UE device 102 determines the signal strength of the received wireless 4G signals. In some embodiments, the determined geographical location, e.g., the GPS coordinates, the determined velocity and the determined 4G wireless signal strength are stored in the data/information section 720 of memory 710. In some embodiments, step 212 is optional.

Operation proceeds from step 212 to step 214. In step 214, the first user equipment device, UE device 102, determines the likelihood, i.e., probability, of the UE device 102 initiating a call using 4G technology but having to switch over to 3G technology during the call. The switchover from using 4G technology to 3G technology is also referred to as 4G to 3G fallback. The switchover in most but not all cases results from the UE device 102 moving from a geographic area with 4G network coverage to a geographic area with 3G network coverage during the call. The determination of the probability of switchover from 4G to 3G is based on a geographical location indication, for example the GPS coordinates determined in step 204.

In some embodiments, the determination of the probability of switchover from 4G to 3G is also based on the determined velocity of the user device and/or the determined signal strength of the 4G wireless signals being received by the UE device 102 I/O interfaces. For example, the probability may be, and in some embodiments is, determined by generating an estimated length of time for the UE 102 device to go from its current geographical position where it has access to 4G network coverage to a geographical position only having 3G network coverage based on the current GPS coordinates, the determined velocity of the UE 102 device and the estimated or typical duration of a call. In some embodiments, the estimated duration of a call is the average length of a call. The UE device 102 contains geographical information on the 4G and 3G network coverage available to it. This geographical information on the availability of 4G and 3G network coverage may be, and in some embodiments is, downloaded and stored in the data/information section 720 of memory 710 of the UE device 102 from the service provider with which the UE device 102 is registered. The length of time determined until switchover from 4G to 3G is used to determined the probability of the a switchover from 4G to 3G network occurring during a call. For example, in some embodiments, when the determined length of time to a switchover event is less than the estimated duration of a call then the probability of switchover is determined to be not probable or unlikely to occur during a call to be setup. If the duration of the determined length of time to a switchover event is equal to or greater than the estimated duration of a call then the probability of switchover is determined to be probable or likely to occur during a call to be setup.

In some embodiments, the UE device 102 determines the probability of switchover from 4G to 3G using a call duration distribution function. The call duration distribution function may be a logarithmic function or an exponential function. In some embodiments, the call duration distribution function is based on data collected on the historical duration of calls made or received by UE device 102. In some embodiments, the call duration distribution function is provided to the UE device 102 from the service provider with which the UE device 102 is registered. In some embodiments, the call duration distribution function is based on the time of day, call origination information and call destination information. After the probability of the UE device 102 switchover from 4G to 3G during a call to be setup has been determined operation proceeds from step 214 to step 216.

In step 216, the first user device, UE device 102, generates a call setup message, e.g., a SIP INVITE call setup message with header information indicating the probability of the UE device 102 switching from operating on a 4G network to a 3G network during the call to be setup in response to the call setup message. The probability included in the header information may be, and in some embodiments is, a flag that is either set or cleared. When the flag is set, it indicates that it is likely or probable the first user equipment device, UE device 102, will experience a 4G to 3G fallback/switchover event during the duration of the call to be setup in response to the call setup message. When the flag is cleared, it indicates that it is not likely or probable that a 4G to 3G fallback/switchover will occur during the duration of the call to be setup in response to the call setup message. In some embodiments, the probability information included in the call setup message header is a number between zero and one hundred representing the percentage of likelihood that a switchover will occur during the duration of the call to be setup in response to the call setup message. For example, this probability may be determined by the length of time before a projected switch over is to occur and a call duration distribution function as discussed above. Operation proceeds from step 216 to step 218.

In step 218, the first user equipment device, UE device 102, transmits the generated SIP Invite call setup message 205 to a second user device via a session border controller. The SIP Invite call setup message is transmitted via one of the I/O interfaces 708 or 711 of the UE device 102. Operation then proceeds to step 220.

In step 220, Session Border Controller (SBC) 106 receives via its I/O interface 808 the SIP Invite call setup message transmitted from UE device 102 with the ultimate destination address being a second user device. Operation proceeds from step 220 to step 222. In step 222, the SBC 106 extracts the fallback/switchover probability from the header of the received message. Operation proceeds from step 222 to step 224.

In step 224, the SBC 106 determines whether an ATGW 110 is to be introduced into the call media path for the call to be setup between the first user device, UE device 102, and the second user device in response to the received call setup message based on the fallback/switchover probability extracted from the received SIP Invite call setup message. In some embodiments, this determination step further includes sub-step 226. In sub-step 226, the SBC 106 determines using the extracted fallback/switchover probability whether media for the call to be established is to be anchored in an ATGW. Operation proceeds from step 224 to step 228.

In step 228, the SBC 106 controls the introduction of the ATGW 110 into the call path based upon the determination of whether the ATGW 110 is to be introduced into the call path or not. In some embodiments, step 228 includes sub-step 230. In sub-step 230, the SBC 106 instructs the ATGW 110 to anchor at the ATGW 110 the media for the call to be setup in response to the call setup message when the determination is to introduce into the call path between the UE 102 and the second user device an ATGW and that said media of the call is to be anchored by the ATGW. In some embodiments, the SBC 106 performs this instruction operation by transmitting an instruction and/or command signal and/or message, e.g., command message 207, to the ATGW 110 to anchor at the ATGW 110 the media stream associated with the call to be setup between the first user device and the second user device in response to the call setup message. Operation proceeds from step 228 to step 232. In step 232, the ATGW 110 anchors the media for the call to be setup in response to the call setup message. In some embodiments, step 232 includes the step of receiving an instruction or command message and/or signal from the SBC 106. In some embodiments the Access Transfer Gateway functionality is implemented as part of the SBC 106. In such embodiments the SBC 106 anchors the media for the call when it is determined that the media for the call is to be anchored at the ATGW.

In some embodiments, the call setup message header only includes a 4G to 3G fallback likelihood/probability indication when it is not likely for the call to experience a 4G to 3G fallback/switchover during a call. When the SBC 106 receives a message that indicates that a fallback/switchover is not likely, it does not introduce the ATGW into the call path. However, when it receives an SIP Invite call setup message with no header information regarding the probability/likelihood of a 4G to 3G switchover/fallback then it introduces an ATGW into the call path for the call being setup and the ATGW anchors the media for the call. In some embodiments, the default is not to introduce the ATGW into the call unless a call setup message provides an indication that the ATGW is to be introduced into the call.

In some embodiments where the user equipment device UE device 102 includes a GPS receiver the UE device determines the current/last few minutes speed of the UE device. The UE device 102 also measures the signaling strength of the wireless 4G signals it is currently receiving at its I/O interfaces 708 or 711. The UE device 102 then determines the likelihood of getting out of the current cell coverage area based on this information. When the UE device 102 determines that a cell change is unlikely, it can insert a header/parameter in the SIP Invite call setup message to indicate this determination. When SBC 106 receives the SIP Invite call setup message with the header/parameter that indicates an ATGW is not to be introduced into the media path of the call, the SBC 106 does not introduce the ATGW 110 into the call path and the ATGW does not anchor the media for the call. When the SIP call setup Invite message does not include the header/parameter that indicates that an ATGW is to be introduced into the call path, the ATGW is introduced into the call path and anchors the media for the call.

Figure 3:
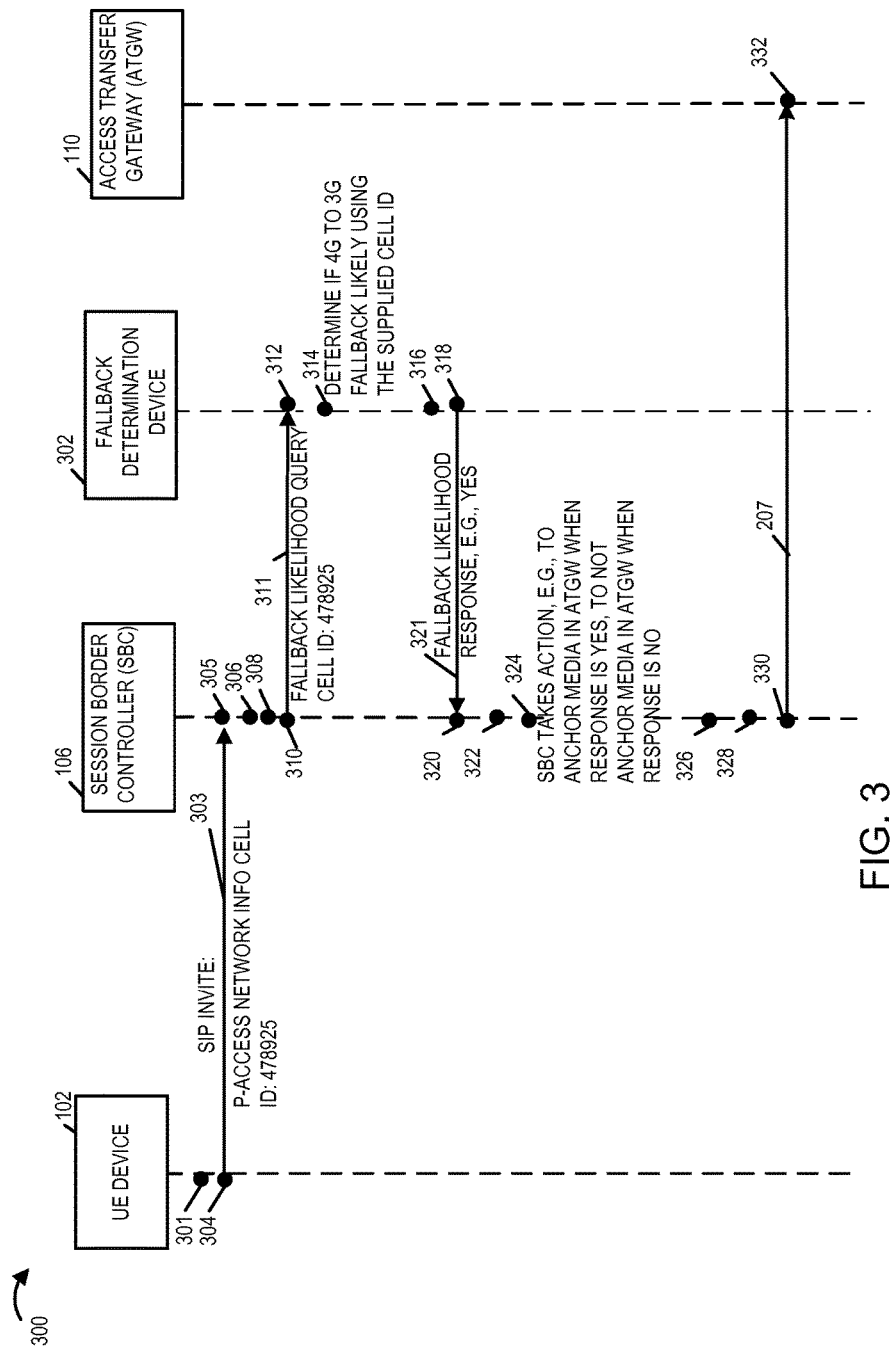
FIG. 3 is a signaling diagram in accordance with an exemplary embodiment of the present invention.

FIG. 3 illustrates a signaling diagram 300 showing an exemplary communications system's signaling and the steps implemented as part of an exemplary method. For explanatory purposes only the user device 102, session border controller (SBC) 106, Fallback Determination Device 302 and Access Transfer Gateway (ATGW) 110 are shown and described in FIG. 3 although the communication system includes other equipment such as a second user equipment device 2. In this example, the exemplary user device UE 102 also referred to as the first user device is a mobile device implemented in accordance with exemplary user device 700 illustrated in FIG. 7. The exemplary SBC 106 is implemented in accordance with the exemplary SBC 800 illustrated in FIG. 8. FIG. 11 shows details of exemplary fallback determination device 302. FIG. 14 shows the details of exemplary ATGW 110.

Operation begins in step 301, when the first user device, UE device 102, generates a SIP Invite call setup message 303 with a P-Access-Network-Info header, for example, P-Access-Network-Info: . . . ; utran-cell-id-3gpp=478925. The P-Access-Network-Info header includes cell-id information corresponding to the cell within which the first user device is located. Operation proceeds from step 301 to step 304.

In step 304, the first user device 102 transmits the SIP Invite call setup message 303 with the P-Access-Network-Info header to Session Border Controller (SBC) 106. The P-Access-Network-Info includes information about the current network cell in which the first device is currently operating. Operation proceeds from step 304 to step 305.

In step 305, the SBC 106 receives via one of its I/O interfaces 808 or 809, the SIP Invite call setup message 303 transmitted by the first user device 102. Operation proceeds from step 305 to step 306. In step 306, the SBC 106 extracts the cell_id from the P-Access-Network-Info. Operation proceeds from step 306 to step 308.

In step 308, the SBC 106 generates a 4G to 3G switchover/fallback likelihood query including the extracted cell-id. In the exemplary embodiment, the query is a query message 311 transmitted to a 4G to 3G switchover/fallback determination device 302. Operation proceeds from step 308 to step 310.

In step 310, the SBC 106 sends the switchover/fallback likelihood query to fallback determination device 302. Operation then proceeds to step 312.

In step 312, the fallback determination device 302 receives the fallback likelihood query message with the cell id. Operation proceeds from step 312 to step 314. In step 314 the fallback determination device 302 determines if 4G to 3G switchover or fallback is likely based on the cell id supplied in the query. For example, in some embodiments the fallback determination device 302 accesses a database where 4G coverage for neighboring areas is stored for each cell. In some embodiments, the database is contained within the fallback determination device 302. In some embodiments, the database is external to fallback determination device 302. The fallback determination device 302 then determines whether or not it is likely or probably for the device to switch from 4G to 3G based on the stored information regarding 4G network coverage in the vicinity of the first user device based on the cell id supplied. For example, if the first user device supplied a cell_id corresponding to a geographic area where all neighboring cells also have 4G coverage, it is more likely than not that a fallback or switchover won't happen. The fallback determination device then determines that a fallback is not likely to occur. Similarly, in an example where 90% of the neighboring cells do not support 4G coverage, the fallback determination device will determine that a fallback is likely to occur. The threshold percentage of the number of neighboring cells that do not support 4G coverage for there to be a determination that a fallback is likely to occur may be, and in some embodiments is, programmable with the 90% being only an exemplary percentage. In some embodiments, the velocity of the device at or preceding the call setup time can be used as an additional parameter in determining the probability or likelihood that a switchover or fallback will occur during a call to be setup in response to the call setup message. For example, the fallback determination module may use the location provided by the cell_id and the direction and speed of the first user device to determine whether the cells along the projected path of the first user device support 4G coverage or not. If the cells along the projected path do not support 4G then a determination that it is likely or probably for a 4G to 3G switchover or fallback will occur. In some embodiments, the estimated duration of a call may also be used as a parameter in determining whether a 4G to 3G fallback is probable or likely to occur. In some embodiments just the speed and not the direction of the first user device is used in determining the likelihood of a 4G to 3G switchover occurring. For example, all cells within a given circular area defined by a radius that is equal to a distance generated by multiplying the estimated or an estimated duration of the call times the speed of the first user device may be identified and the percentage of such cells having 4G coverage determined. This percentage may then be used as an estimate to determine whether a fallback event is likely to occur. The exemplary methods of determining the probability or likelihood of 4G to 3G switchover discussed in connection with FIGS. 2A and 2B are also applicable to other exemplary methods discussed herein including the exemplary method of FIG. 3. In some embodiments, the fallback determination device 302 may estimate the destination of the first user device and the likelihood/probability of a fallback determination may be based on this information. For example, the fallback determination device 302 may, and in some embodiments does, determine whether the cells in a projected path have 4G coverage or not. After the determination is made of the 4G to 3G probability or likelihood switchover or fallback is to occur during the call to be setup in response to the call setup message by the fallback determination device 302, operation proceeds to step 316.

In step 316, the fallback determination device 302 generates a fallback likelihood response message 321. The fallback likelihood response message contains an indication of whether a fallback or switchover is likely or probable. In some embodiments the fallback likelihood response message includes the likelihood or probability of fallback or switchover occurring during the duration of a call to be setup. Operation proceeds from step 316 to step 318.

In step 318, the fallback determination device 302 sends the fallback likelihood response message 321 to the SBC 106 via one of its I/O Interfaces 1108 or 1111. Operation proceeds from step 318 to step 320.

In step 320, the SBC 106 receives the fallback likelihood response message 321. Operation proceeds from step 320 to step 322.

In step 322, the SBC 106 extracts the fallback/switchover probability information from the received response message 321. Operation proceeds from step 322 to step 324.

In step 324, the SBC 106 determines whether an ATGW 110 is to be introduced into the call media path for the call to be setup between the first user device, UE device 102, and the second user device in response to the received call setup message 303 based on the fallback/switchover probability information extracted from the response message 321. In some embodiments, this determination step further includes sub-step 326. In sub-step 326, the SBC 106 determines using the extracted fallback/switchover probability information whether media for the call to be established is to be anchored in an ATGW. Operation proceeds from step 324 to step 328.

In step 328, the SBC 106 controls the introduction of the ATGW 110 into the call path based upon the determination of whether the ATGW 110 is to be introduced into the call path or not. When the SBC 106 determines that the ATGW 110 is not to be introduced into the call path, the SBC takes action so that the ATGW 110 is not introduced into the call path between the first user device and the second user device and so that the media of the call is not anchored in an ATGW. In such embodiments, the SBC may take actions so that the call flow bypasses the ATGW. When the determination is that the ATGW is not to be introduced the steps and optional subsystems 330 and 332 are bypassed in the method. In some embodiments, step 328 includes sub-step 330. In sub-step 330, the SBC 106 instructs the ATGW 110 to anchor at the ATGW 110 the media for the call to be setup in response to the call setup message 303 when the determination is to introduce into the call path between the first user device UE 102 and the second user device an ATGW and that said media of the call is to be anchored by the ATGW. In some embodiments, the SBC 106 performs this instruction operation by transmitting an instruction and/or command signal and/or message, e.g., command message 207, to the ATGW 110 to anchor at the ATGW 110 the media stream associated with the call to be setup between the first user device and the second user device in response to the call setup message. Operation proceeds from step 328 to step 332. In step 332, the ATGW 110 anchors the media for the call to be setup in response to the call setup message 303. In some embodiments, step 332 includes the step of receiving an instruction or command message and/or signal from the SBC 106. In some embodiments the Access Transfer Gateway functionality is implemented as part of the SBC 106. In such embodiments the SBC 106 anchors the media for the call when it is determined that the media for the call is to be anchored at the ATGW.

In some embodiments, the Fallback Determination Device 302 is implemented as a server. In some embodiments, the Fallback Determination Device 302 is implemented as software and/or hardware logic within the SBC 106. In some of such embodiments, the information included in the fallback likelihood query message and response fallback likelihood message may be, and sometimes are, implemented as information/data stored in the data/information section 820 of memory 810 of the SBC 106 and are accessed via the memory instead of being sent as messages.

Figure 4:
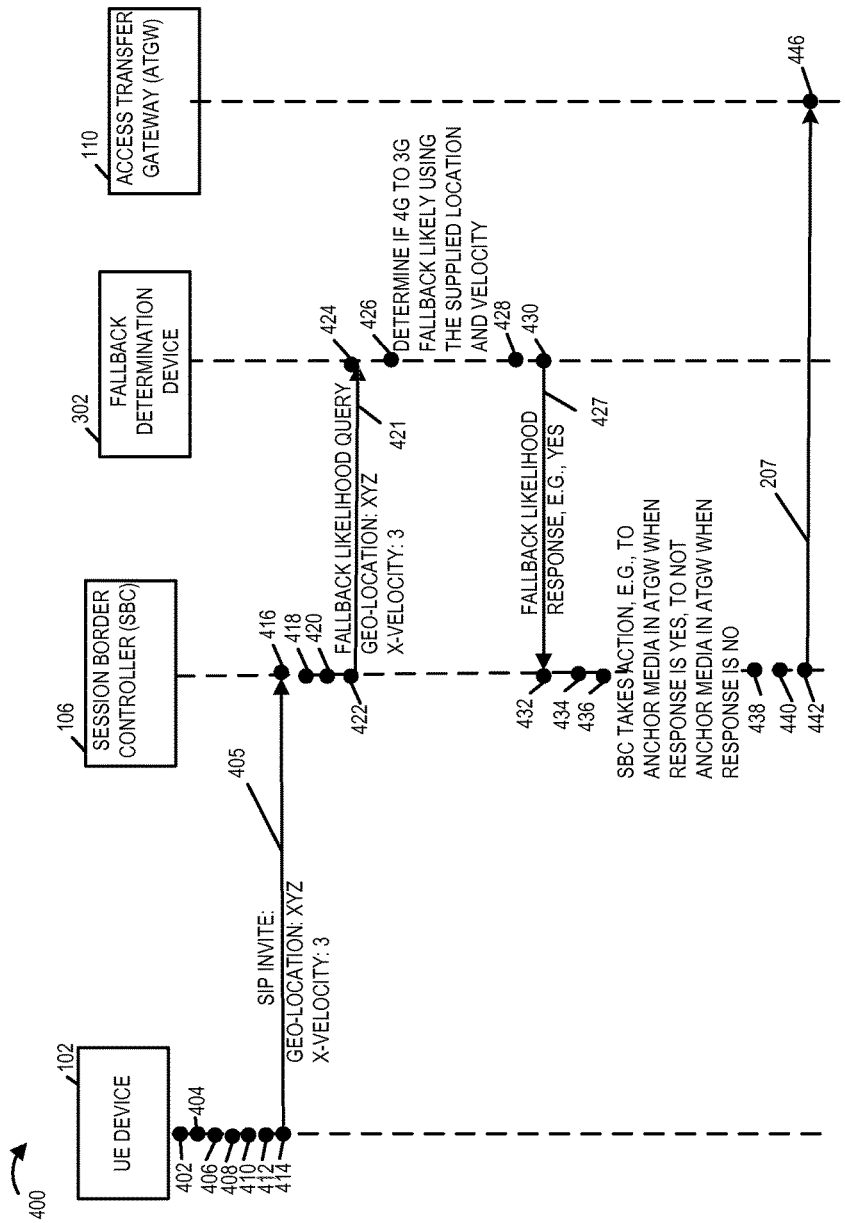
FIG. 4 is a signaling diagram in accordance with an exemplary embodiment of the present invention.

FIG. 4 illustrates a signaling diagram 400 showing another embodiment of an exemplary communications system's signaling and the steps implemented as part of an exemplary method. For explanatory purposes only the user device 102, session border controller (SBC) 106, Fallback Determination Device 302 and Access Transfer Gateway (ATGW) 110 are shown and described in FIG. 4 although the communication system includes other equipment such as a second user equipment device 2. In this example, the exemplary user device UE 102 also referred to as the first user device is a mobile device implemented in accordance with exemplary user device 700 illustrated in FIG. 7. The exemplary SBC 106 is implemented in accordance with the exemplary SBC 800 illustrated in FIG. 8. FIG. 11 shows details of exemplary fallback determination device 302. FIG. 14 shows the details of exemplary ATGW 110.

The method 400 starts in step 402, where the processor 706 of the first user equipment device, UE device 102, begins executing various instructions from the assembly of modules 718 and various modules from the assembly of modules 719 also operate to perform the various steps of the method. Operation proceeds from start step 402 to step 404.

In step 404, the first user equipment device, UE device 102, determines that it is operating in a geographic area with 4G network coverage. Step 404 includes sub-step 406 wherein the first user device determines its geographical location. In some embodiments step 406 includes sub-step 408 and/or sub-step 410. In sub-step 408, the first user device's Global Position System (GPS) receiver 722 determines its geographical location by determining the device's global positioning system coordinates from global position system signals received by GPS receiver 722. In sub-step 410, the first user device's GPS receiver 722 also determines the velocity of the first user device, UE device 102, based on global positioning system signals received by the GPS receiver 722. Operation proceeds from step 404 to step 412. In some embodiments, the first user device determines its geographical position using the identification of the cell id in which it is currently operating and then accessing memory storage that correlates cell id to a geographical position. In some embodiments, the first user device determines its current geographical position and velocity using cell tower triangulation wherein the first user device determines it velocity based on the wireless signals received from three or more cell towers. In some embodiments, the first user device uses global positioning system signals to determine it geographical position and when global position system signals are not available or the first user device is not able to determine its geographical position from the global positioning system signals then the first user device uses triangulation of wireless signals received from cell towers or another method to determine its geographic position. In various embodiments, the order in which different methods of determining the geographic position of the first user device is varied depending on the location of the first user device.

In step 412, the first user device, UE device 102, generates a call setup message 405, e.g., a SIP INVITE call setup message with header information indicating the geographic position of the first user device, UE device 102. The geographic position or location information included in the header information may be, and in some embodiments is, the global position coordinates determined by the first user device. In some embodiments, the call setup message header information also includes the velocity of the device determined by the first user device 102. In some embodiments, the header information includes the speed but not the direction of the first user device 102. Operation proceeds from step 412 to step 414.

In step 414, the first user equipment device, UE device 102, transmits the generated SIP Invite call setup message 405 to a second user device via a session border controller 106. The SIP Invite call setup message 405 is transmitted via one of the I/O interfaces 708 or 711 of the UE device 102. Operation then proceeds to step 416.

In step 416, Session Border Controller (SBC) 106 receives via its I/O interface 808 the SIP Invite call setup message 405 transmitted from UE device 102 with the ultimate destination address being a second user device. Operation proceeds from step 416 to step 418. In step 418, the SBC 106 extracts the geographical position or location information from the header of the received message 405. In the embodiments in which the speed or velocity of the first user device were also included in the header information, the SBC 106 extracts the speed or velocity information from the received SIP Invite call setup message 405. Operation proceeds from step 418 to step 420.

In step 420, the SBC 106 generates a 4G to 3G switchover/fallback likelihood query including the received geographical location information and the velocity or speed of the first user device 102 if that information was included in the received SIP Invite call setup message 405. The query may be, and in some embodiments is, a query message 421 transmitted to a 4G to 3G switchover/fallback determination device. Operation proceeds from step 420 to step 422.

In step 422, the SBC 106 sends the switchover/fallback likelihood query 421 to fallback determination device 302. Operation then proceeds to step 424.

In step 424, the fallback determination device 302 receives the fallback likelihood query message 421 with the geographical location information and in some embodiments the velocity or speed of the first user device. Operation proceeds from step 424 to step 426.

In step 426 the fallback determination device 302 determines if 4G to 3G switchover or fallback is likely based on the geographical location information and in some embodiments the speed or velocity of the first user device supplied in the query. For example, in some embodiments the fallback determination device 302 accesses a database or memory where 4G coverage information is stored for geographically neighboring areas. In some embodiments, the database or memory is contained within the fallback determination device 302. In some embodiments, the database or memory is external to fallback determination device 302. The fallback determination device 302 then determines whether or not it is likely or probably for the first user device 102 to switch from 4G to 3G based on the stored information regarding 4G network coverage in the vicinity of the first user device 102 based on the information supplied, i.e., the geographical position and in some embodiments the speed or velocity of the first user device 102. For example, if the first user device supplied global position system coordinates corresponding to a geographic area where all neighboring cells also have 4G coverage, it is more likely than not that a fallback or switchover won't happen. The fallback determination device then determines that a fallback is not likely to occur. Similarly, in the example where 90% of the neighboring cells do not support 4G coverage, the fallback determination device will determine that a fallback is likely to occur. The threshold percentage of the number of neighboring cells that do not support 4G coverage for there to be a determination that a fallback is likely to occur may be, and in some embodiments is, programmable with the 90% being only an exemplary percentage. In some embodiments, the velocity of the device at or preceding the call setup time can be used as an additional parameter in determining the probability or likelihood that a switchover or fallback will occur during a call to be setup in response to the call setup message. For example, the fallback determination module may use the location provided by the geographical position and the direction and speed of the first user device to determine whether the cells along the projected path of the first user device support 4G coverage or not. If the cells along the projected path do not support 4G then a determination that it is likely or probably for a 4G to 3G switchover or fallback will occur. In some embodiments, the estimated duration of a call may also be used as a parameter in determining whether a 4G to 3G fallback is probable or likely to occur. In some embodiments just the speed and not the direction of the first user device is used in determining the likelihood of a 4G to 3G switchover occurring. For example, all cells within a given circular area defined by a radius that is equal to a distance generated by multiplying the estimated duration of the call times the speed of the first user device may be identified and the percentage of such cells having 4G coverage determined. This percentage may then be used as an estimate to determine whether a fallback event is likely to occur. The exemplary methods of determining the probability or likelihood of 4G to 3G switchover discussed in connection with FIGS. 2A and 2B are also applicable to the exemplary method of FIG. 4. In some embodiments, the fallback determination device 302 may estimate the destination of the first user device and the likelihood/probability of a fallback determination may be based on this information. For example, the fallback determination device 302 may, and in some embodiments does, determine whether the cells in a projected path have 4G coverage or not. After the determination of the 4G to 3G probability or likelihood of a switchover or fallback event occurring during the call to be setup in response to the call setup message 405 is made by the fallback determination device 302, operation proceeds from step 426 to step 428.

In step 428, the fallback determination device 302 generates a fallback likelihood response message 427. The fallback likelihood response message 427 contains an indication of whether a fallback or switchover is likely or probable. In some embodiments the fallback likelihood response message 427 includes the likelihood or probability of fallback or switchover occurring during the duration of a call to be setup. Operation proceeds from step 428 to step 430.

In step 430, the fallback determination device 302 sends the fallback likelihood response message 427 to the SBC 106 via one of its I/O Interfaces 1108 or 1111. Operation proceeds from step 430 to step 432.

In step 432, the SBC 106 receives the fallback likelihood response message 427 via one of its I/O Interfaces. Operation proceeds from step 432 to step 434.

In step 434, the SBC 106 extracts the fallback/switchover probability information from the received response message 427. Operation proceeds from step 434 to step 436.

In step 436, the SBC 106 determines whether an ATGW 110 is to be introduced into the call media path for the call to be setup between the first user device, UE device 102, and the second user device in response to the received call setup message 405 based on the fallback/switchover probability information extracted from the response message 427. In some embodiments, this determination step further includes sub-step 438. In sub-step 438, the SBC 106 determines using the extracted fallback/switchover probability information whether media for the call to be established is to be anchored in an ATGW. Operation proceeds from step 436 to step 440.

In step 440, the SBC 106 controls the introduction of the ATGW 110 into the call path based upon the determination of whether the ATGW 110 is to be introduced into the call path or not. When the SBC 106 determines that the ATGW 110 is not to be introduced into the call path, the SBC takes action so that the ATGW 110 is not introduced into the call path between the first user device and the second user device and so that the media of the call is not anchored in an ATGW. In such embodiments, the SBC may take actions so that the call flow bypasses the ATGW. When the determination is that the ATGW is not to be introduced the steps and optional subsystems 442 and 446 are bypassed in the method. In some embodiments, step 440 includes sub-step 442. In sub-step 442, the SBC 106 instructs the ATGW 110 to anchor at the ATGW 110 the media for the call to be setup in response to the call setup message when the determination is to introduce into the call path between the UE 102 and the second user device an ATGW and that said media of the call is to be anchored by the ATGW. In some embodiments, the SBC 106 performs this instruction operation by transmitting an instruction and/or command signal and/or message, e.g., command message 207, to the ATGW 110 to anchor at the ATGW 110 the media stream associated with the call to be setup between the first user device and the second user device in response to the call setup message 405. Operation proceeds from step 440 to step 446.

In step 446, the ATGW 110 anchors the media for the call to be setup in response to the call setup message 405. In some embodiments, step 446 includes the step of receiving an instruction or command message and/or signal from the SBC 106. In some embodiments the Access Transfer Gateway functionality is implemented as part of the SBC 106. In such embodiments the SBC 106 anchors the media for the call when it is determined that the media for the call is to be anchored at the ATGW.

In some embodiments, the Fallback Determination Device 302 is implemented as a server. In some embodiments, the Fallback Determination Device 302 is implemented as software and/or hardware logic within the SBC 106. In some of such embodiments, the information included in the fallback likelihood query message 421 and response fallback likelihood message 427 may be, and sometimes are, implemented as information/data stored in the data/information section 820 of memory 810 of the SBC 106 and are accessed via the memory instead of being sent as messages.

Figure 5:
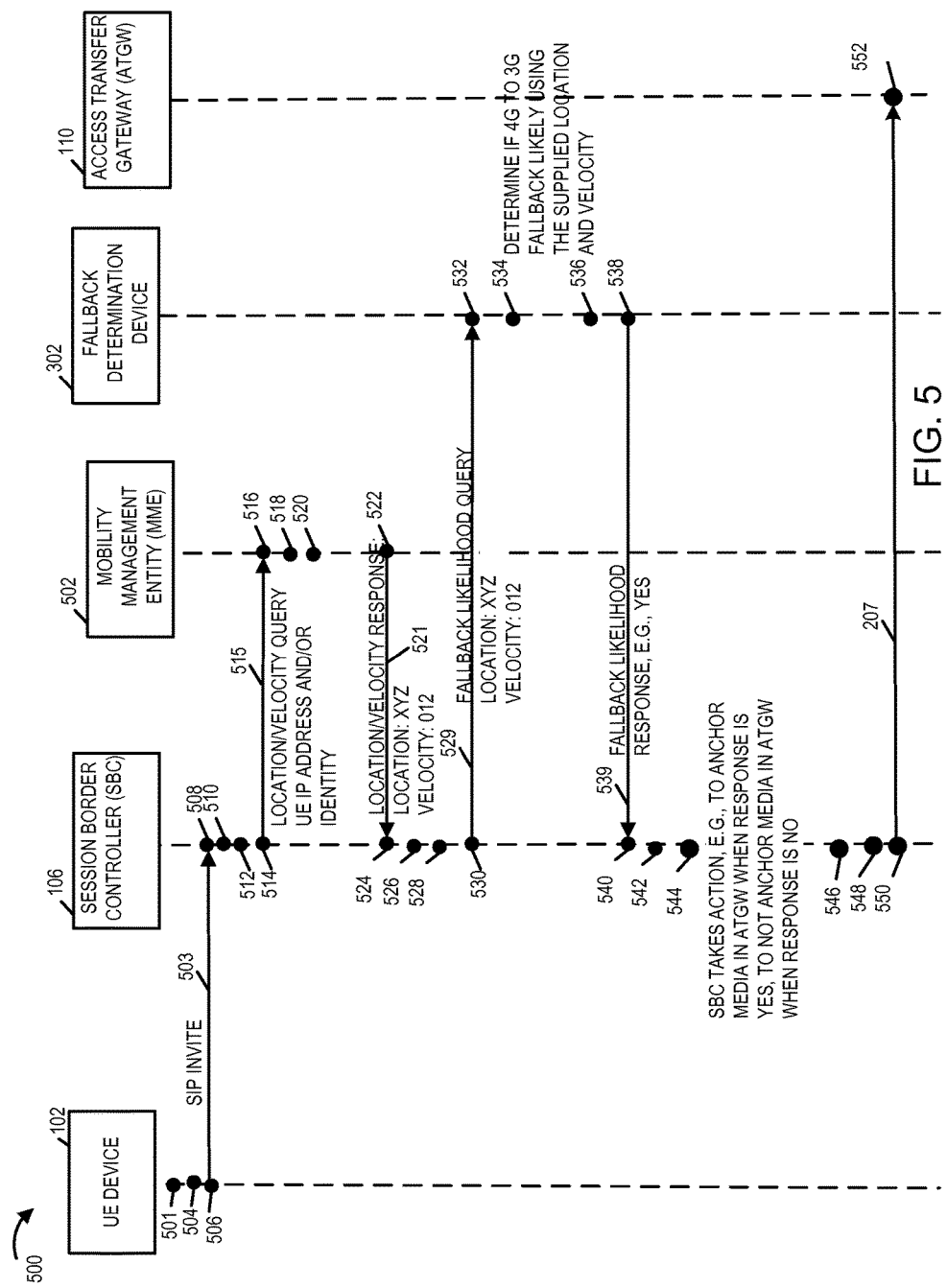
FIG. 5 is a signaling diagram in accordance with an exemplary embodiment of the present invention.

FIG. 5 illustrates a signaling diagram 500 showing another embodiment of an exemplary communications system's signaling and the steps implemented as part of an exemplary method. For explanatory purposes only the user device 102, session border controller (SBC) 106, Mobility Management Entity (MME) 502, Fallback Determination Device 302 and Access Transfer Gateway (ATGW) 110 are shown and described in FIG. 5 although the communication system includes other equipment such as a second user equipment device 2. In this example, the exemplary user device UE 102 also referred to as the first user device is a mobile device implemented in accordance with exemplary user device 700 illustrated in FIG. 7. The exemplary SBC 106 is implemented in accordance with the exemplary SBC 800 illustrated in FIG. 8. FIG. 12 shows details of the exemplary Mobile Mobility Entity (MME) 502. FIG. 11 shows details of exemplary fallback determination device 302. FIG. 14 shows the details of exemplary ATGW 110.

The method 500 starts in step 501, where the processor 706 of the first user equipment device, UE device 102, begins executing various instructions from the assembly of modules 718 and various modules from the assembly of modules 719 also operate to perform various steps of the method. Operation proceeds from start step 501 to step 504.

In step 504, the first user device, UE device 102, generates a call setup message, e.g., a SIP INVITE call setup message 503. The call setup message includes the first user equipment device IP address and/or identity. Operation proceeds from step 504 to step 506.

In step 506, the first user equipment device, UE device 102, transmits the generated SIP Invite call setup message 503 to a second user device via a session border controller 106. The SIP Invite call setup message 503 is transmitted via one of the I/O interfaces 708 or 711 of the UE device 102. Operation then proceeds to step 508.

In step 508, Session Border Controller (SBC) 106 receives via its I/O interface 808 the SIP Invite call setup message 503 transmitted from UE device 102 with the ultimate destination address being a second user device. Operation proceeds from step 508 to step 510.

In step 510, the SBC 106 determines the first user device 102 IP address and/or identity. Operation proceeds from step 510 to step 512.

In step 512, the SBC 106 generates a location/velocity query message 515 which includes the first user device, UE device 102, IP address and/or identity. Operation proceeds from step 512 to step 514.

In step 514, SBC 106 transmits the location/velocity query 515 via one of its I/O interfaces to MME 502. Operation proceeds from step 514 to step 516.

In step 516, MME 502 receives the transmitted location/velocity query 515 from SBC 106 via one of its I/O Interfaces. Operation proceeds from step 516 to step 518.

In step 518, the MME 502 determines based on information received in the location/velocity query message 515 the currently available location and velocity information for the first user device 102. In some embodiments, the information received in the location/velocity query message 515 used by the MME 502 is the IP address and/or identity of the first user device 102. Operation proceeds from step 518 to step 520.

In step 520, the MME 502 generates a location/velocity response message 521 which includes the location, e.g., geographical location, and velocity of the first user device. Operation proceeds from step 520 to step 522.

In step 522, the MME 502 transmits the location/velocity response message 521 to the SBC 106 via one of its I/O Interfaces. Operation proceeds from step 522 to step 524.

In step 524, the SBC 106 receives the location/velocity response message 521 from the MME 502 via one of its I/O interfaces. Operation proceeds from step 524 to step 526.

In step 526, the SBC 106 extracts the location and velocity information for the first user device 102 from the location/velocity response message. Operation proceeds to step 528.

In step 528, the SBC 106 generates a 4G to 3G switchover/fallback likelihood query including the received geographical location information and the velocity or speed of the first user device if that information was included in the response message 521. The query, may be and in some embodiments is, a query message transmitted to a 4G to 3G switchover/fallback determination device 302. Operation proceeds from step 528 to step 530.

In step 530, the SBC 106 sends the switchover/fallback likelihood query to fallback determination device 302. Operation then proceeds to 532.

In step 532, the fallback determination device 302 receives the fallback likelihood query message 529 with the geographical location information and in some embodiments the velocity or speed of the first user device 102. Operation proceeds from step 532 to step 534.

In step 534 the fallback determination device 302 determines if 4G to 3G switchover or fallback is likely based on the geographical location information and in some embodiments the speed or velocity of the first user device supplied in the query. For example, in some embodiments the fallback determination device 302 may, and in some embodiments does, access a memory or database where 4G coverage information is stored for geographically neighboring areas. In some embodiments, the memory or database is contained within the fallback determination device 302. In some embodiments, the database is external to fallback determination device 302. The fallback determination device 302 then determines whether or not it is likely or probably for the device to switch from 4G to 3G based on the stored information regarding 4G network coverage in the vicinity of the first user device based on the information supplied, i.e., the geographical position and in some embodiments the speed or velocity of the first user device. For example, if the supplied first user device location information corresponds to a geographical area where all neighboring cells also have 4G coverage, it is more likely than not that a fallback or switchover won't happen. The fallback determination device then determines that a fallback is not likely to occur. Similarly, in the example where 90% of the neighboring cells do not support 4G coverage, the fallback determination device will determine that a fallback is likely to occur. The threshold percentage of the number of neighboring cells that do not support 4G coverage for there to be a determination that a fallback is likely to occur may be, and in some embodiments is, programmable with the 90% being only an exemplary percentage. In some embodiments, the velocity of the device is used as an additional parameter in determining the probability or likelihood that a switchover or fallback will occur during a call to be setup in response to the call setup message. For example, the fallback determination module may use the location provided by the geographical position and the direction and speed of the first user device to determine whether the cells along the projected path of the first user device support 4G coverage or not. If the cells along the projected path do not support 4G then a determination that it is likely or probably for a 4G to 3G switchover or fallback will occur. In some embodiments, the estimated duration of a call may also be used as a parameter in determining whether a 4G to 3G fallback is probable or likely to occur. In some embodiments just the speed and not the direction of the first user device is used in determining the likelihood of a 4G to 3G switchover occurring. For example, all cells within a given circular area defined by a radius that is equal to a distance generated by multiplying the estimated duration of the call times the speed of the first user device may be identified and the percentage of such cells having 4G coverage within that area determined. This percentage may then be used as an estimate to determine whether a fallback event is likely to occur. The exemplary methods of determining the probability or likelihood of 4G to 3G switchover discussed in connection with FIGS. 2A and 2B are also applicable to the exemplary method of FIG. 5. In some embodiments, the fallback determination device 302 may estimate the destination of the first user device and the likelihood/probability of a fallback determination may be based on this information. For example, the fallback determination device 302 may, and in some embodiments does, determine whether the cells in a projected path have 4G coverage or not. After the determination of the 4G to 3G probability or likelihood of a switchover or fallback event occurring during the call to be setup in response to the call setup message is made by the fallback determination device 302, operation proceeds from step 534 to step 536.

In step 536, the fallback determination device 302 generates a fallback likelihood response message 539. The fallback likelihood response message contains an indication of whether a fallback or switchover is likely or probable. In some embodiments the fallback likelihood response message includes the likelihood or probability of fallback or switchover occurring during the duration of a call to be setup. Operation proceeds from step 536 to step 538.

In step 538, the fallback determination device 302 sends the fallback likelihood response message 539 to the SBC 106. Operation proceeds from step 538 to step 540.

In step 540, the SBC 106 receives the fallback likelihood response message 539. Operation proceeds from step 540 to step 542.

In step 542, the SBC 106 extracts the fallback/switchover probability information from the received response message 539. Operation proceeds from step 542 to step 544.

In step 544, the SBC 106 determines whether an ATGW 110 is to be introduced into the call media path for the call to be setup between the first user device, UE device 102, and the second user device in response to the received call setup message based on the fallback/switchover probability information extracted from the response message. In some embodiments, this determination step further includes sub-step 546. In sub-step 546, the SBC 106 determines using the extracted fallback/switchover probability information whether media for the call to be established is to be anchored in an ATGW. Operation proceeds from step 544 to step 548.

In step 548, the SBC 106 controls the introduction of the ATGW 110 into the call path based upon the determination of whether the ATGW 110 is to be introduced into the call path or not. When the SBC 106 determines that the ATGW 110 is not to be introduced into the call path, the SBC takes action so that the ATGW 110 is not introduced into the call path between the first user device and the second user device and so that the media of the call is not anchored in an ATGW. In such embodiments, the SBC may take actions so that the call flow bypasses the ATGW. When the determination is that the ATGW is not to be introduced the steps and optional subsystems 5500 and 552 are bypassed in the method. In some embodiments, step 548 includes sub-step 550. In sub-step 550, the SBC 106 instructs the ATGW 110 to anchor at the ATGW 110 the media for the call to be setup in response to the call setup message when the determination is to introduce into the call path between the UE 102 and the second user device an ATGW and that said media of the call is to be anchored by the ATGW. In some embodiments, the SBC 106 performs this instruction operation by transmitting an instruction and/or command signal and/or message, e.g., command message 207, to the ATGW 110 to anchor at the ATGW 110 the media stream associated with the call to be setup between the first user device and the second user device in response to the call setup message. Operation proceeds from step 550 to step 552.

In step 552, the ATGW 110 anchors the media for the call to be setup in response to the call setup message 503. In some embodiments, step 552 includes the step of receiving an instruction or command message and/or signal from the SBC 106. In some embodiments the Access Transfer Gateway functionality is implemented as part of the SBC 106. In such embodiments the SBC 106 anchors the media for the call when it is determined that the media for the call is to be anchored at the ATGW.

In some embodiments, the Fallback Determination Device 302 is implemented as a server. In some embodiments, the Fallback Determination Device 302 is implemented as software and/or hardware logic within the SBC 106. In some of such embodiments, the information included in the fallback likelihood query message and response fallback likelihood message may be, and sometimes are, implemented as information/data stored in the data/information section 820 of memory 810 of the SBC 106 and are accessed via the memory instead of being sent as messages.

FIG. 6 illustrates a signaling diagram 600 showing another embodiment of an exemplary communications system's signaling and the steps implemented as part of an exemplary method. For explanatory purposes only the user device 102, session border controller (SBC) 106, Serving-Call Session Control Function Server 602 and Access Transfer Gateway (ATGW) 110 are shown and described in FIG. 6 although the communication system includes other equipment such as a second user equipment device 2. In this example, the exemplary user device UE 102 also referred to as the first user device is a mobile device implemented in accordance with exemplary user device 700 illustrated in FIG. 7. The exemplary SBC 106 is implemented in accordance with the exemplary SBC illustrated in FIG. 8. FIG. 13 shows the details of exemplary S-CSCF Server 602. FIG. 14 shows the details of exemplary ATGW 110.

The method 600 starts in step 601, where the processor 706 of the first user equipment device, UE device 102, begins executing various instructions from the assembly of modules 718 and various modules from the assembly of modules 719 also operate to perform various steps of the method. Operation proceeds from start step 601 to step 604.

In step 604, the first user device, UE device 102, generates a call setup message, e.g., a SIP INVITE call setup message 603. The call setup message may, and in some embodiments does, include the first user equipment device IP address and/or identity. Operation proceeds from step 604 to step 606.

In step 606, the first user equipment device, UE device 102, transmits the generated SIP Invite call setup message 603 to a second user device via a session border controller 106. The SIP Invite call setup message 603 is transmitted via one of the I/O interfaces 708 or 711 of the UE device 102. Operation then proceeds to step 608.

In step 608, Session Border Controller (SBC) 106 receives via its I/O interface 808 the SIP Invite call setup message 603 transmitted from UE device 102 with the ultimate destination address being a second user device. Operation proceeds from step 608 to step 610.

In step 610, the SBC 106 transmits a SIP Invite call setup message 611 to the control server S-CSCF Server 602 including the IP address and/or identity of the first user device via one of the SBC 106 I/O Interfaces 808 or 809. Operation proceeds from step 610 to step 612.

In step 612, the S-CSCF Server 602 receives via one of its I/O interfaces the transmitted SIP Invite call setup message 611. Operation proceeds from step 612 to step 613.

In step 613, the S-CSCF Server 602 in response to receiving the call setup SIP Invite message 611 determines if 4G to 3G switchover or fallback is likely based on the IP address and/or identity of the first user device 102 supplied in the SIP Invite message 611 using one of the methods described in connection with FIG. 5. The determination being further based upon the geographical location and/or speed or velocity of the first user device 102 as determined from the first user device's IP address and/or identity.

In some embodiments, the S-CSCF 602 generates a 4G to 3G switchover or fallback likelihood/probability indication which is the likelihood probability of a fallback event occurring. Operation proceeds from step 613 to step 614.

In step 614, the S-CSCF 602 inserts the fallback indication into a new fallback indication header parameter of a SIP 18X/Update message 615 that is part of the call setup process. Operation proceeds from step 614 to step 616.

In step 616, the S-CSCF 602 transmits the SIP 18X/Update message 615 to the SBC 106 via one of its I/O interfaces. Operation proceeds from step 616 to step 618.

In step 618, the SBC 106 receives the SIP 18X/Update message 615 including the fallback likelihood indication in the new header parameter. Operation proceeds from step 618 to step 620.

In step 620, the SBC 106 extracts the fallback/switchover probability indication information from the received SIP 18X/Update message 615. Operation proceeds from step 620 to step 622.

In step 622, the SBC 106 determines whether an ATGW 110 is to be introduced into the call media path for the call to be setup between the first user device, UE device 102, and the second user device in response to the received call setup message 603 based on the fallback/switchover probability information extracted from the response message 615. In some embodiments, this determination step further includes sub-step 624. In sub-step 624, the SBC 106 determines using the extracted fallback/switchover probability information whether media for the call to be established is to be anchored in an ATGW. Operation proceeds from step 622 to step 626.

In step 626, the SBC 106 controls the introduction of the ATGW 110 into the call path based upon the determination of whether the ATGW 110 is to be introduced into the call path or not. When the SBC 106 determines that the ATGW 110 is not to be introduced into the call path, the SBC takes action so that the ATGW 110 is not introduced into the call path between the first user device and the second user device and so that the media of the call is not anchored in an ATGW. In such embodiments, the SBC may take actions so that the call flow bypasses the ATGW. When the determination is that the ATGW is not to be introduced the steps and optional subsystems 628 and 630 are bypassed in the method. In some embodiments, step 626 includes sub-step 628. In sub-step 628, the SBC 106 instructs the ATGW 110 to anchor at the ATGW 110 the media for the call to be setup in response to the call setup message when the determination is to introduce into the call path between the UE 102 and the second user device an ATGW and that said media of the call is to be anchored by the ATGW. In some embodiments, the SBC 106 performs this instruction operation by transmitting an instruction and/or command signal and/or message, e.g., command message 207, to the ATGW 110 to anchor at the ATGW 110 the media stream associated with the call to be setup between the first user device 102 and the second user device in response to the call setup message 603. Operation proceeds from step 626 to step 630.

In step 630, the ATGW 110 anchors the media for the call to be setup in response to the call setup message. In some embodiments, step 630 includes the step of receiving an instruction or command message and/or signal from the SBC 106. In some embodiments the Access Transfer Gateway functionality is implemented as part of the SBC 106. In such embodiments the SBC 106 anchors the media for the call when it is determined that the media for the call is to be anchored at the ATGW.

In some embodiments of the present invention, a Proxy-Call Session Control Function Server (P-CSCF Server) performs the method steps described as being performed by the SBC 106 in connection with FIGS. 2A, 2B, 3, 4, 5, and 6. In some embodiments of the present invention, an enhanced Access Transfer Control Function Server performs the method steps described as being performed by the SBC 106 in connection with FIGS. 2A, 2B, 3, 4, 5, and 6. In some embodiments, an SBC performs the function of an Access Transfer Function Server but makes the determination of whether to insert an ATGW into the call media path based on a location indication of the originating or destination device instead of the type of access network from which a call is being originated. In some embodiments, a SBC and no Access Transfer Control Function Server is used. In some embodiments the SBC anchors the signaling path for all calls passing through and unlike an Access Transfer Control Function Server does not make a determination as to whether or not it should be included in a call path.

Figure 9:
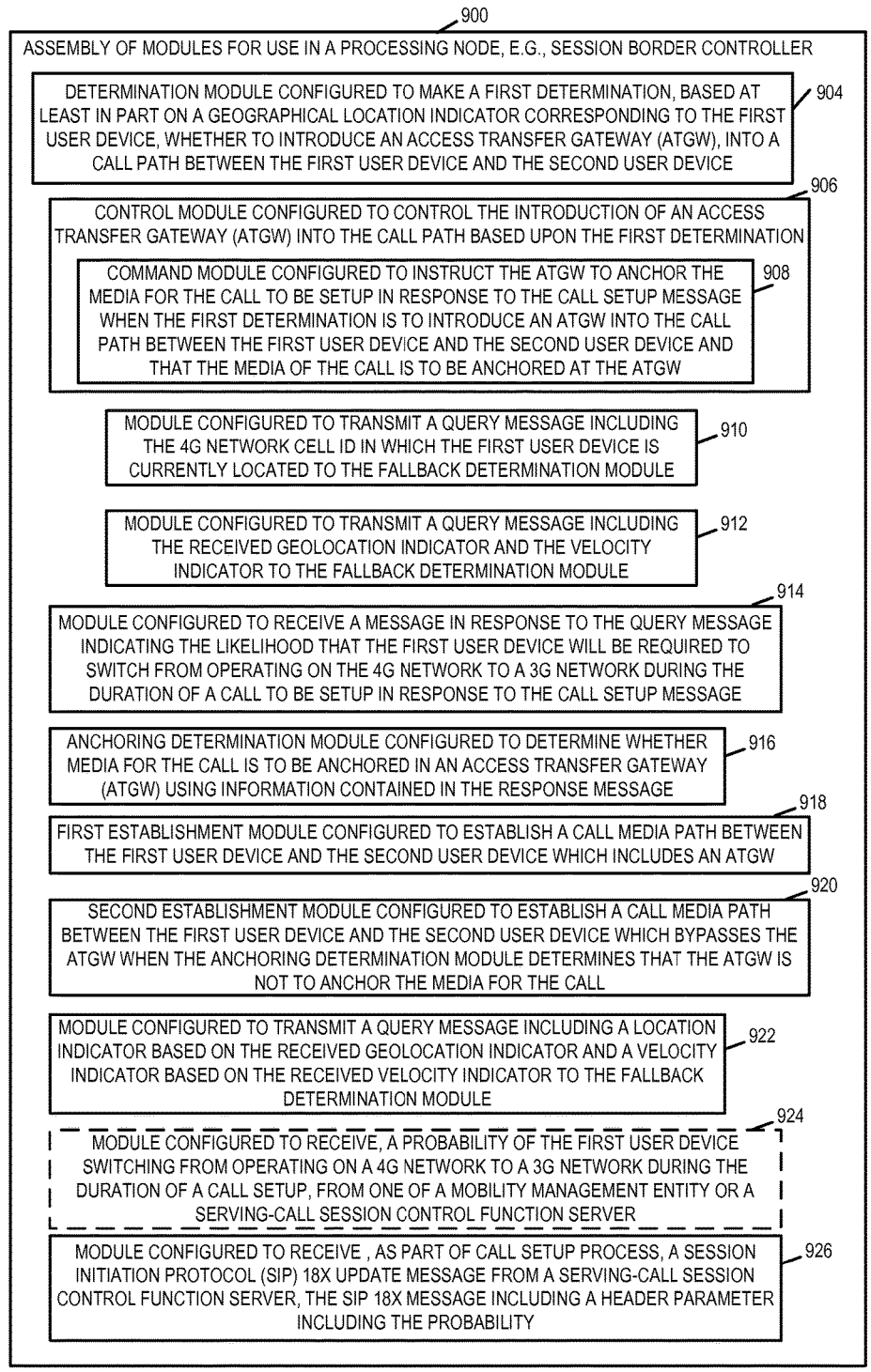
FIG. 9 is a drawing of an exemplary assembly of modules which may be included in processing node such as the session border controller of FIG. 8.

FIG. 9 illustrates an assembly of modules 900 which can, and in some embodiments is, used in the SBC 800 illustrated in FIG. 8. The modules in the assembly of modules 900 can, and in some embodiments are, implemented fully in hardware within the processor 806, e.g., as individual circuits. The modules in the assembly of modules 900 can, and in some embodiments are, implemented fully in hardware within the assembly of modules 819, e.g., as individual circuits corresponding to the different modules. In other embodiments some of the modules are implemented, e.g., as circuits, within the processor 806 with other modules being implemented, e.g., as circuits within assembly of modules 819, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 810 of the SBC 800, with the modules controlling operation of SBC 800 to implement the functions corresponding to the modules when the modules are executed by a processor, e.g., processor 806. In some such embodiments, the assembly of modules 900 is included in the memory 810 as assembly of modules 818. In still other embodiments, various modules in assembly of modules 900 are implemented as a combination of hardware and software, e.g., with another circuit external to the processor providing input to the processor 806 which then under software control operates to perform a portion of a module's function. While shown in the FIG. 8 embodiment as a single processor, e.g., computer, it should be appreciated that the processor 806 may be implemented as one or more processors, e.g., computers.

When implemented in software the modules include code, which when executed by the processor 806, configure the processor 806 to implement the function corresponding to the module. In embodiments where the assembly of modules 900 is stored in the memory 910, the memory 910 is a computer program product comprising a computer readable medium comprising code, e.g., individual code for each module, for causing at least one computer, e.g., processor 806, to implement the functions to which the modules correspond.

Completely hardware, e.g., circuits, based or completely software based modules may be used. However, it should be appreciated that any combination of software and hardware, e.g., circuit implemented modules may be used to implement the functions. As should be appreciated, the modules illustrated in FIG. 9 control and/or configure the SBC 800 or elements therein such as the processor 806, to perform the functions of the corresponding steps illustrated in the signaling and method diagrams of FIGS. 2A, 2B, 3, 4, 5, and 6. Thus the assembly of modules 900 includes various modules that perform functions of the corresponding steps of the method shown in FIGS. 2A, 2B, 3, 4, 5 and 6.

The assembly of modules 900 of FIG. 9 may be, and in some embodiments is, used in a processing node. One or more of the modules of FIG. 9 may be included in the exemplary session border controller, e.g., session border controller 106, the fallback determination module 302, the Mobility Management Entity 502, and/or the Serving-Call Session Control Function Server 602 of the exemplary embodiments illustrated or described in FIGS. 1B, 1C, 1D, 2A, 2B, 3, 4, 5, and 6. In some embodiments, one or more of the assembly of modules 900 of FIG. 9 are used in a user device such as for example the determination module 904 configured to make a first determination based at least in part on a geographical location indicator corresponding to the first user device, whether to introduce an access transfer gateway (ATGW), into a call path between the first user device and the second user device.

Assembly of modules 900 includes a determination module 904 configured to make a first determination, based at least in part on a geographical location indicator corresponding to a first user device, whether to introduce an Access Transfer Gateway (ATGW), into a call path between the first user device and a second user device. The assembly of modules 900 also includes a control module 906 configured to control the introduction of an access transfer gateway (ATGW) into the call path based upon the first determination. In some embodiments, the control module 906 includes a command sub-module 908 configured to instruct an ATGW to anchor the media for the call to be setup in response to a call setup message when the first determination is to introduce an ATGW into the call path between the first user device and the second user device and that the media of the call is to be anchored at the ATGW.

The assembly of modules 900 also includes a module 910 configured to transmit a query message including the 4G network cell id in which the first user device is currently located to a fallback determination module. The assembly of modules 900 includes a module 912 configured to transmit a query message including the received geo-location indicator and the velocity indicator to a fallback determination module. The assembly of modules 900 includes a module 914 configured to receive a message in response to a query message, the received message indicating the likelihood that the first user will be required to switch from operating on a 4G network to a 3G network during the duration of a call to be setup in response to a call setup message.

The assembly of modules 900 also includes an anchoring determination module 916 configured to determine whether media for the call is to be anchored in an Access Transfer Gateway (ATGW) using information contained in a response message from a query message requesting the likelihood of fallback from 4G to 3G service. The assembly of modules 900 includes a first establishment module 918 configured to establish a call media path between the first user device and the second user device which includes an ATGW. The assembly of modules 900 includes a second establishment module 920 configured to establish a call media path between the first user device and the second user device which bypasses the ATGW when the anchoring determination module 916 determines that the ATGW is not to anchor the media for the call. The assembly of modules 900 includes a module 922 configured to transmit a query message to a fallback determination module, the query message including a location indicator based on a received geo-location indicator and a velocity indicator based on a received velocity indicator. The assembly of modules 900 including an optional receiver module 924 configured to receive from one of a mobility management entity or a serving-call session control function server, a probability of the first user device switching from operating on a 4G network to a 3G network during the duration of a call to be setup. The assembly of modules 900 also includes a receiver module 926 configured to receive, as part of a call setup process, a session initiation protocol (SIP) 18X/UPDATE message from a serving-call session control function server, the SIP 18X/UPDATE message including a header parameter including the probability of a switchover event from 4G to 3G service.

Figure 10:
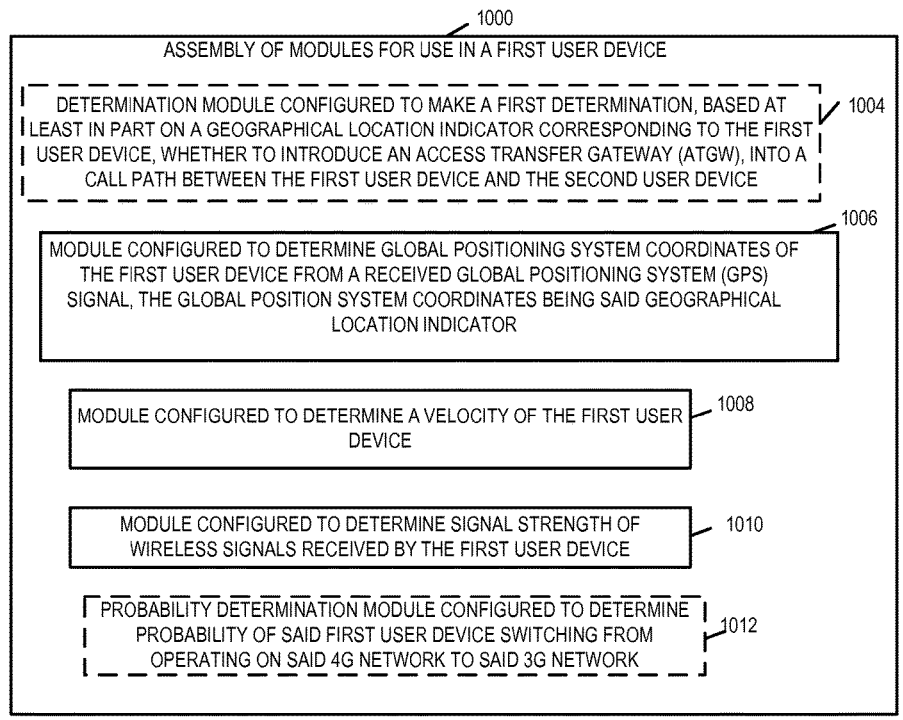
FIG. 10 is a drawing of an exemplary assembly of modules which may be included in the user device of FIG. 7.

FIG. 10 is an assembly of modules 1000 for use in a first user device. The assembly of modules may be included in the exemplary user equipment device, e.g., user device 700 of FIG. 7 and UE device 102 of FIGS. 1A, 1B, 1C, 1D, 2A, 3, 4, 5, and 6. Assembly of modules 1000 includes a determination module 1004 configured to make a first determination, based at least in part on a geographical location indicator corresponding to a first user device, as to whether or not to introduce an Access Transfer Gateway (ATGW), into a call path between the first user device and a second user device. The assembly of modules 1000 also includes a module 1006 configured to determine the global positioning system coordinates of the first user device from one or more received global positioning system (GPS) signals received. The assembly of modules 1000 also includes a module 1008 configured to determine the velocity of the first user device. The assembly of module 1000 includes a module 1010 configured to determine the signal strength of wireless signals, e.g., 4G network wireless signals, received by the first user device. The assembly of modules 1000 also includes a probability determination module 1012 configured to determine the probability or likelihood of the first user device switching from operating on a 4G network to a 3G network during the duration of a call to be setup.

The techniques of various embodiments may be implemented using software, hardware and/or a combination of software and hardware. Various embodiments are directed to apparatus and/or systems, e.g., communications device such as for example a session border controller, etc. Various embodiments are also directed to methods, e.g., a method of operating a communications device such as a session border controller, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware, e.g., circuits, or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a session border controller (SBC) including a processor configured to implement one, multiple or all of the steps of one or more methods of the invention.

In some embodiments, the processor or processors, e.g., CPUs, of one or more devices, e.g., of the communications device, e.g., session border controller, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a session border controller, with a processor which includes a module corresponding to each of the steps of the various described methods performed by the device in which the processor is included. In some but not all embodiments an apparatus, e.g., a communications device, e.g., a session border controller, includes a module corresponding to each of the steps of the various described methods performed by the device in which the processor is included. The modules may be implemented using software and/or hardware. The hardware may be circuits, ASICs or other specialized or dedicated circuitry.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method comprising:
   receiving, at a first processing node, a call setup message from a first user device to a second user device, said first processing node being a Session Border Controller, said first user device being a mobile device operating in a 4G network, said call setup message being a Session Initiation Protocol (SIP) INVITE message including a 4G network cell id corresponding to a 4G network cell in which the first user device is currently located;
   making a first determination whether to introduce into a call path between the first user device and the second user device an Access Transfer Gateway (ATGW) based at least in part on a geographical location indicator corresponding to the first user device and a probability of said first user device switching from operating in said 4G network to operating in a 3G network during the duration of a call to be setup in response to said call setup message;
   controlling, by the first processing node, the introduction of the ATGW into the call path based upon the first determination;
   wherein making said first determination includes determining whether media of the call to be setup in response to said call setup message is to be anchored at said ATGW; and
   transmitting a second Internet Protocol address only to the ATGW and not to the second user device when an Internet Protocol address corresponding to the first user device changes from a first Internet Protocol address to said second Internet Protocol address during said call established in response to the call setup message.

2. The method of claim 1 further including determining global positioning system coordinates of the first user device, said global position system coordinates being said geographical location indicator and wherein making said first determination is further based on one or more of the following: a velocity of the first user device or a signal strength of the first user device.

3. The method of claim 1, wherein said first determination is made by one of the following: a fallback determination device, said Session Border Controller, or said first user device.

4. The method of claim 1, wherein said first determination is made by a fallback determination module; and
   wherein said Session Initiation Protocol (SIP) INVITE message includes said geographical location indicator corresponding to the first user device and a velocity indicator corresponding to said first user device.

5. The method of claim 1,
   wherein said first determination is made by the Session Border Controller;
   wherein said Session Initiation Protocol (SIP) INVITE message includes said geographical location indicator corresponding to the first user device and a velocity indicator corresponding to said first user device; and
   wherein the method further includes transmitting from said Session Border Controller to a fallback determination module a query message including a location indicator based on the received geographical location indicator and a velocity indicator based on said received velocity indicator.

6. The method of claim 5 further including:
   generating, by said fallback determination module, said probability of said first user device switching from operating in said 4G network to operating in a 3G network during the duration of a call to be setup in response to said call setup message based on: (i) said location indicator included in said query message and (ii) said velocity indicator included in said query message; and
   generating, by said fallback determination module, a response message to said query message, said response message including the generated probability, said generated probability indicating the likelihood that said first user device will be required to switch from operating in said 4G network to operating in a 3G network during the duration of a call to be setup in response to said call setup message.

7. The method of claim 6,
wherein said first determination is made by said Session Border Controller using information contained in said response message.

8. The method of claim 7, wherein making said first determination using information contained in said response message includes:
determining, by said Session Border Controller, whether said generated probability received in said response message is greater than a first threshold.

9. The method of claim 1,
wherein said first determination is further based on whether the probability of the first user device switching from operating in the 4G network to operating in a 3G network during the duration of a call setup in response to said call setup message is greater than a first threshold.

10. The method of claim 9 further comprising:
receiving by the Session Border Controller as part of a call setup process for the call a Session Initiation Protocol (SIP) 18X Update message from a Serving-Call Session Control Function Server, said SIP 18X Update message including a header parameter including said probability.

11. A method comprising:
receiving, at a first processing node, a call setup message from a first user device to a second user device, said first processing node being a Session Border Controller;
making a first determination based at least in part on a geographical location indicator corresponding to the first user device whether to introduce into a call path between the first user device and the second user device an Access Transfer Gateway (ATGW);
controlling, by the first processing node, the introduction of the ATGW into the call path based upon the first determination, said first user device being a mobile device operating in a 4G network, said first determination being made by a fallback determination device, and said call setup message being a Session Initiation Protocol (SIP) INVITE message including a 4G network cell id corresponding to a 4G network cell in which the first user device is currently located;
transmitting, from said Session Border Controller to said fallback determination device, a query message including the 4G network cell id corresponding to the 4G network cell in which the first user device is currently located;
receiving, by said Session Border Controller, a response message in response to said query message from said fallback determination device indicating the likelihood that said first user device will be required to switch from operating in said 4G network to operating in a 3G network during the duration of a call to be setup in response to said call setup message;
making a determination, by said Session Border Controller, of whether media for said call is to be anchored in the Access Transfer Gateway (ATGW) using information contained in said response message; and
when an Internet Protocol address corresponding to the first user device changes from a first Internet Protocol address to a second Internet Protocol address during said call established in response to the call setup message transmitting the second Internet Protocol address only to the ATGW and not to the second user device.

12. A system comprising:
a first processing node including a receiver configured to receive a call setup message from a first user device to a second user device, said first processing node being a Session Border Controller, said first user device being a mobile device operating in a 4G network, said call setup message being a Session Initiation Protocol (SIP) INVITE message including a 4G network cell id corresponding to a 4G network cell in which the first user device is currently located;
a determination module configured to make a first determination whether to introduce an Access Transfer Gateway (ATGW) into a call path between the first user device and the second user device based at least in part on a geographical location indicator corresponding to the first user device and a probability of said first user device switching from operating in said 4G network to operating in a 3G network during the duration of a call to be setup in response to said call setup message;
a control module in said first processing node configured to control the introduction of the ATGW into the call path based upon the first determination;
wherein said first determination includes determining whether media of the call to be setup in response to said call setup message is to be anchored at said ATGW; and
when an Internet Protocol address corresponding to the first user device changes from a first Internet Protocol address to a second Internet Protocol address during said call established in response to the call setup message transmitting the second Internet Protocol address only to the ATGW and not to the second user device.

13. The system of claim 12, further comprising:
a global positioning system (GPS) receiver configured to determine the global positioning system coordinates of the first user device, said global positioning system coordinates being said geographical location indicator; and
wherein said determination module is configured to make said first determination further based on one or more of the following: a velocity of the first user device or a signal strength of the first user device.

14. The system of claim 12,
wherein said determination module is configured to make said first determination further based on one or more of the following: a velocity of the first user device or a signal strength of the first user device.

15. The system of claim 12,
wherein said determination module is a fallback determination module; and
wherein said Session Border Controller comprises:
an interface configured to:
transmit a query message including the 4G network cell id corresponding to the 4G network cell in which the first user device is currently located to said fallback determination module, said 4G network cell id corresponding to the 4G network cell in which the first user device is currently located being said geographical location indicator corresponding to the first user device; and
receive a response message in response to said query message from said fallback determination module indicating the likelihood that said first user device will be required to switch from operating in said 4G network to operating in a 3G network during the duration of the call to be setup in response to said call setup message; and an anchoring determination module configured to determine whether media for said call is to be anchored in the Access Transfer Gateway (ATGW) using information contained in said response message.

16. The system of claim 12, wherein said determination module is a fallback determination module, and wherein said Session Initiation Protocol (SIP) INVITE message includes said geographical location indicator corresponding to the first user device and a velocity indicator corresponding to said first user device.

17. The system of claim 16 wherein said Session Border Controller includes:

an interface configured to transmit from said Session Border Controller a query message including a location indicator based on the received geographical location indicator and a velocity indicator based on said received velocity indicator to said fallback determination module.

18. The system of claim 12 wherein said determination module making said first determination is included in said first processing node.

19. The system of claim 18, wherein said Session Border Controller is configured to receive, as part of a call setup process for said call, a Session Initiation Protocol (SIP) 18X Update message from a Serving-Call Session Control Function Server, said SIP Update 18X message including a header parameter including said probability.

20. The system of claim 12, wherein said first determination is further based on whether the probability of the first user device switching from operating in the 4G network to operating in a 3G network during the duration of the call setup in response to said call setup message is greater than a first threshold.

* * * * *